US012394271B2

(12) United States Patent
Locke et al.

(10) Patent No.: US 12,394,271 B2
(45) **Date of Patent: *Aug. 19, 2025**

(54) SYSTEM AND METHOD FOR DISPENSING CONSUMABLE LIQUIDS

(71) Applicant: EMC Water LLC, Downers Grove, IL (US)

(72) Inventors: Edward Locke, Elmhurst, IL (US); Raymond T. Hecker, Elmhurst, IL (US); Trevor Robert Smouter, Waterloo (CA); Timothy Scott Edward Hiller, Waterloo (CA)

(73) Assignee: EMC Water LLC, Downers Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,509

(22) Filed: May 10, 2024

(65) Prior Publication Data

US 2024/0296708 A1 Sep. 5, 2024

Related U.S. Application Data

(63) Continuation of application No. 18/458,370, filed on Aug. 30, 2023, now abandoned, which is a
(Continued)

(51) Int. Cl.
*G07F 13/00* (2006.01)
*B67D 1/00* (2006.01)
(Continued)

(52) U.S. Cl.
CPC ........... *G07F 13/00* (2013.01); *B67D 1/0014* (2013.01); *B67D 1/0857* (2013.01);
(Continued)

(58) Field of Classification Search
CPC ..... G07F 13/00; B67D 1/0014; B67D 1/0857; B67D 1/0878; B67D 1/0888;
(Continued)

(56) References Cited

U.S. PATENT DOCUMENTS 3,368,683 A 2/1968 Rak
5,296,148 A 3/1994 Colangelo et al.
(Continued)

FOREIGN PATENT DOCUMENTS

CA 1261435 A1 9/1989
CA 2079578 A1 6/1993
(Continued)

OTHER PUBLICATIONS

International Searching Authority, International Search Report and Written Opinion from corresponding International Application No. PCT/US15/28846, dated Aug. 5, 2015 (18 pages).
(Continued)

*Primary Examiner* — Garcia Ade
(74) *Attorney, Agent, or Firm* — Husch Blackwell LLP

(57) ABSTRACT

Systems and methods for dispensing consumable liquids are disclosed. An example networked system includes a server and a plurality of beverage dispenser stations. Each of the beverage dispenser stations includes a filler including a filler outlet configured to deliver a beverage into a container, an RFID reader configured to read an RFID tag fixed to a water filter through which water for the beverage is to flow, and a controller. The controller is configured determine a duration-of-use of the water filter and a volume of water that has passed through the water filter. Each of the beverage dispenser stations also includes a network communications interface configured to communicate the duration-of-use and
(Continued)

the volume of water to the networked administrative server to track use of the water filter among the plurality of beverage dispenser stations.

20 Claims, 17 Drawing Sheets

Related U.S. Application Data continuation of application No. 17/817,900, filed on Aug. 5, 2022, now Pat. No. 11,776,350, which is a continuation of application No. 17/062,351, filed on Oct. 2, 2020, now Pat. No. 11,410,483, which is a continuation of application No. 16/687,352, filed on Nov. 18, 2019, now Pat. No. 11,004,298, which is a continuation of application No. 15/642,672, filed on Jul. 6, 2017, now Pat. No. 10,482,704, which is a continuation of application No. 14/701,973, filed on May 1, 2015, now Pat. No. 9,704,329.

(60) Provisional application No. 61/987,219, filed on May 1, 2014.

(51) Int. Cl.
*B67D 1/08* (2006.01)
*B67D 1/12* (2006.01)
*B67D 3/00* (2006.01)
*G07F 13/02* (2006.01)

(52) U.S. Cl.
CPC ......... *B67D 1/0878* (2013.01); *B67D 1/0888* (2013.01); *B67D 1/1279* (2013.01); *B67D 3/0009* (2013.01); *B67D 3/0022* (2013.01); *B67D 2210/0001* (2013.01); *B67D 2210/00089* (2013.01); *B67D 2210/00118* (2013.01)

(58) Field of Classification Search
CPC ................ B67D 1/1279; B67D 3/0009; B67D 3/0022; B67D 2210/0001; B67D 2210/00089; B67D 2210/00118
USPC ........................................................... 705/15
See application file for complete search history.

(56) References Cited

U.S. PATENT DOCUMENTS 5,580,444 A 12/1996 Burrows
5,674,381 A 10/1997 Den Dekker
5,676,824 A 10/1997 Jeon et al.
5,681,463 A 10/1997 Shimizu et al.
5,845,504 A 12/1998 Lebleu
5,888,381 A 3/1999 Primdahl et al.
5,889,684 A 3/1999 Ben-David et al.
6,004,460 A 12/1999 Palmer et al.
6,139,730 A 10/2000 Buehler et al.
6,165,362 A 12/2000 Nohren, Jr. et al.
6,319,414 B1 11/2001 Wiseburgh et al.
6,436,282 B1 8/2002 Gundrum et al.
6,569,329 B1 5/2003 Nohren
6,636,151 B2 10/2003 Busick
6,736,298 B2 5/2004 Busick et al.
7,201,005 B2 4/2007 Voglewede et al.
7,258,781 B2 8/2007 Warren et al.
7,338,595 B2 3/2008 Vannewenhizen et al.
7,356,381 B2 4/2008 Crisp, III
7,427,355 B2 9/2008 Chau
7,543,453 B2 6/2009 Boarman et al.
7,658,212 B2 2/2010 Meuleners et al.
7,837,876 B2 11/2010 Ye et al.
8,118,997 B2 2/2012 Ebrom et al.
8,176,948 B2 5/2012 Carrig
8,313,644 B2 11/2012 Harris et al.
8,318,011 B2 11/2012 O'Brien et al.
8,323,490 B1 12/2012 Wright et al.
8,337,697 B2 12/2012 Risheq
8,518,269 B2 8/2013 Fischmann
8,540,094 B2 9/2013 Riedl
8,616,250 B2 12/2013 Herbert
8,621,983 B2 1/2014 Hart et al.
9,004,292 B2 4/2015 Carter et al.
9,045,353 B2 6/2015 Parekh et al.
9,067,805 B2 6/2015 Rajan et al.
9,212,067 B2 12/2015 Gellibolian et al.
9,271,603 B2 3/2016 Yui et al.
9,429,453 B1 8/2016 O'Keeffe et al.
9,475,683 B2 10/2016 Givens et al.
D770,848 S 11/2016 Wilson et al.
9,506,798 B2 11/2016 Saltzgiver et al.
9,533,243 B2 1/2017 Kruckenberg et al.
9,636,613 B2 5/2017 Hayslett et al.
9,656,191 B2 5/2017 Hull et al.
9,668,609 B2 6/2017 Herbert
9,704,329 B2 7/2017 Locke et al.
9,783,430 B2 10/2017 Rice
9,792,409 B2 10/2017 Wernow et al.
9,796,613 B2 10/2017 Tais Zamir et al.
9,856,126 B2 1/2018 Jeon
10,000,370 B2 6/2018 Bethuy et al.
10,077,195 B2 9/2018 Sabin et al.
10,077,847 B2 9/2018 Pan et al.
10,188,230 B2 1/2019 Hambrock et al.
10,189,246 B2 1/2019 Venner et al.
10,286,343 B2 5/2019 Paluszewski et al.
10,406,461 B2 9/2019 Bippus et al.
10,464,800 B2 11/2019 Hevia et al.
10,482,704 B2 11/2019 Locke et al.
10,571,324 B2 2/2020 Biswas et al.
10,596,500 B2 3/2020 Mahdjoubi Namin
10,611,647 B2 4/2020 Park et al.
10,640,393 B2 5/2020 Wilson et al.
10,675,573 B2 6/2020 Miller et al.
10,843,107 B2 11/2020 Bippus et al.
10,926,993 B2 2/2021 Lynch et al.
10,945,447 B2 3/2021 Cocchi et al.
10,969,262 B1 4/2021 Zhang et al.
11,008,206 B2 5/2021 Pappas
11,051,641 B2 7/2021 Schucker et al.
11,148,927 B2 10/2021 Wing et al.
11,186,496 B2 11/2021 Bursztein
11,198,603 B1 12/2021 Shen
11,299,385 B2 4/2022 Shen
11,364,456 B2 6/2022 Macoretta et al.
11,377,337 B2 7/2022 Leeds et al.
11,406,219 B2 8/2022 Jacobsen et al.
11,472,687 B2 10/2022 Mullenaux
11,518,670 B2 12/2022 Kim et al.
11,608,262 B2 3/2023 Lee et al.
11,713,232 B2 8/2023 Rudick et al.
11,739,718 B2 8/2023 Shimpi et al.
11,776,350 B2 10/2023 Locke et al.
2002/0101346 A1 8/2002 Busick
2003/0074194 A1 4/2003 Finnegan
2005/0051476 A1 3/2005 Chen et al.
2005/0097405 A1 5/2005 Sesek et al.
2008/0264092 A1 10/2008 Chase et al.
2009/0192748 A1* 7/2009 Palmer .................. F24H 9/2028
702/130
2009/0242074 A1 10/2009 Carrig
2010/0242491 A1 9/2010 Davis, Jr. et al.
2011/0062060 A1 3/2011 Royal et al.
2013/0066977 A1 3/2013 Katti et al.
2013/0231774 A1 9/2013 Tilton et al.
2014/0114469 A1* 4/2014 Givens ................. B67D 1/0041
222/23
2016/0145119 A1 5/2016 Wang et al.
2016/0355389 A1 12/2016 Bursey et al.
2017/0000993 A1 1/2017 Lin et al.
2017/0066664 A1 3/2017 Sun et al.
2017/0210610 A1 7/2017 Henson et al.
2017/0283137 A1 10/2017 Jiang et al.

(56) References Cited

U.S. PATENT DOCUMENTS

| | | | |
|---|---|---|---|
| 2017/0304776 | A1 | 10/2017 | Guo et al. |
| 2018/0194258 | A1 | 7/2018 | Strauss |
| 2018/0251361 | A1 | 9/2018 | Wing et al. |
| 2020/0029714 | A1 | 1/2020 | Nguyen et al. |
| 2020/0031651 | A1 | 1/2020 | Schneidewend et al. |
| 2020/0122994 | A1 | 4/2020 | Cimatti et al. |
| 2021/0000305 | A1 | 1/2021 | Williams, Jr. |
| 2021/0236991 | A1 | 8/2021 | Schneidewend et al. |
| 2022/0048751 | A1 | 2/2022 | Morris et al. |
| 2022/0275969 | A1 | 9/2022 | Xu et al. |
| 2023/0027542 | A1 | 1/2023 | Boeltl |
| 2023/0107189 | A1 | 4/2023 | Swain et al. |

FOREIGN PATENT DOCUMENTS

| | | | |
|---|---|---|---|
| CA | 2500450 | A1 | 9/2006 |
| CA | 2933185 | C | 8/2021 |
| CA | 2940240 | C | 11/2022 |
| CN | 101852135 | A | 10/2010 |
| DE | 102016004460 | A1 | 10/2016 |
| DE | 102021108840 | A1 | 10/2022 |
| EP | 2119486 | A1 | 11/2009 |
| EP | 3725337 | A1 | 10/2020 |
| FR | 2846650 | A1 | 5/2004 |
| GB | 2161604 | A | 1/1986 |
| WO | 0143089 | A1 | 6/2001 |
| WO | 2010118519 | A1 | 10/2010 |
| WO | 2013166069 | A1 | 11/2013 |

OTHER PUBLICATIONS

European Patent Office, Supplementary European Search Report from corresponding European U.S. Appl. No. 15/786,693, dated Dec. 22, 2017(9 pages).

State Intellectual Property Office of the People's Republic of China, Notification of the First Office Action in corresponding Chinese Application No. 201580029059.6 dated Sep. 4, 2018 (8 pages).

* cited by examiner

| | |
|---|---|
| 502 | Maximum Flow Time (for "On" state) (bmaxflow) |
| 506 | Bottle Move Window (for stillness determination) (botmovewin) |
| 508 | Turn-on Hysteresis (for "Off" state) (hyster) |
| 510 | IR Sensor Signal High Threshold (for sensing too close object) (irhthresh) |
| 512 | IR Sensor Signal Low Threshold (for determining presence) (irlthresh) |
| 514 | IR LED Power Level (for IR sensor assembly LED intensity) (irled) |
| 516 | Minimum Empty Window IR Samples (for zero level) (irminavesamp) |
| 518 | Inter-sample level decrease limit (for recorded IR signal) (irndmax) |
| 520 | Fraction factor (for "On" state change window limit) (iroffdeltafrac) |
| 522 | Measured IR signal value (the digitized IR sensor signal sample) (irval) |
| 524 | Previous Measured IR signal value (previously saved value) (lastirval) |
| 526 | Max time waiting to clear (for "Waiting to Clear" state) (maxclrtime) |
| 528 | Max IR reading while waiting to clear (for "Waiting" state) (maxirclr) |
| 530 | Min IR reading while waiting to clear (for "Waiting" state) (minirclr) |
| 532 | Zero level IR reading (calculated during "Off" state) (minIR) |
| 534 | Minimum still time (for "Off" to "On" transition) (minstilltime) |
| 536 | Copy of Zero IR level (at "On" to "Waiting" state) (minvaluewait) |
| 538 | Maximum allowed IR level increase (for "On" state) (offdeltah) |
| 540 | Maximum allowed IR level decrease (for "On" state) (offdeltal) |
| 542 | Maximum allowed IR level change (for "Off" state "stillness") (ondelta) |
| 544 | Maximum repeated Errors for Soft error (for "Error" state) (softerrlim) |
| 546 | Accumulated continuous still time (for "Off" state) (stilltime) |
| 547 | Accumulated continuous flow time (for "On" state) (flowtime) |
| 548 | Accum. continuous waiting time (for "Waiting to Clear" state) (waittime) |

FIG. 5

FIG. 8
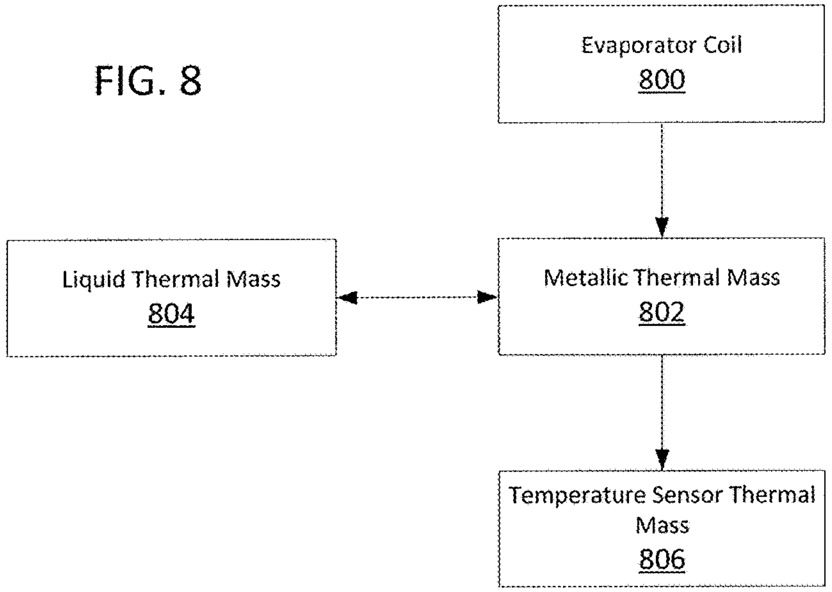
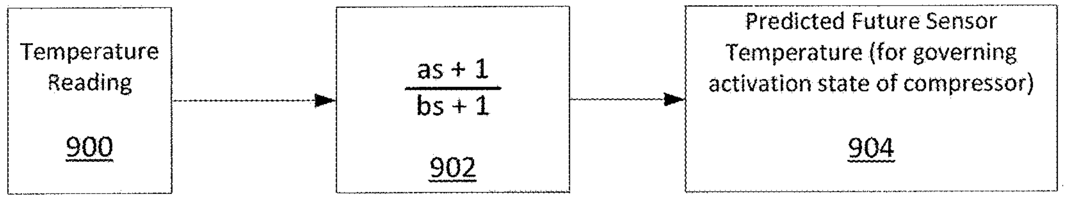
FIG. 9
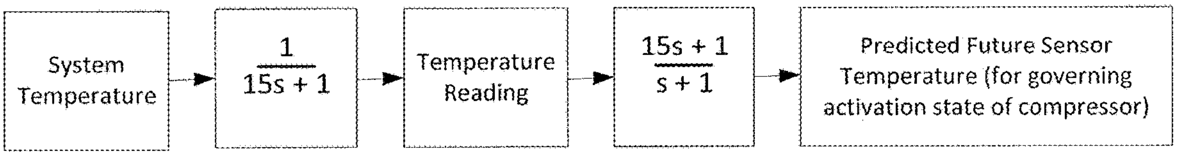
FIG. 12

SYSTEM AND METHOD FOR DISPENSING CONSUMABLE LIQUIDS

CROSS-REFERENCE TO RELATED APPLICATION

This application is a continuation of U.S. application Ser. No. 18/458,370, filed Aug. 30, 2023; which is a continuation of U.S. application Ser. No. 17/817,900, filed Aug. 5, 2022 and now U.S. Pat. No. 11,776,350; which is a continuation of U.S. application Ser. No. 17/062,351, filed on Oct. 2, 2020 and now U.S. Pat. No. 11,410,483; which is a continuation of U.S. application Ser. No. 16/687,352, filed on Nov. 18, 2019 and now U.S. Pat. No. 11,004,298; which is a continuation of U.S. application Ser. No. 15/642,672, filed on Jul. 6, 2017 and now U.S. Pat. No. 10,482,704; which is a continuation of U.S. application Ser. No. 14/701,973, filed on May 1, 2015 and now U.S. Pat. No. 9,704,329; which claims the benefit of U.S. Provisional Application No. 61/987,219, filed on May 1, 2014 and titled "System and Method for Dispensing Consumable Liquids;" the contents of which are expressly incorporated herein by reference in their entirety, including any references therein.

TECHNOLOGICAL AREA

This invention relates generally to the field of consumable liquid dispensers. More particularly, the invention is directed to multi-user consumable liquid dispensers such as liquid container (e.g. bottle) filling stations and water dispenser stations (also known as "bubblers") typically found in public places such as airports, parks, and public buildings.

BACKGROUND OF THE INVENTION

There have been substantial improvements in public consumable liquid dispensers in recent years. No longer are public water dispensers limited to bubblers delivering water at a relatively variable temperature (based upon source water temperature and rate of use). Today, many now include bottle filling taps. The enhanced water bottle filling functionality leads to greater use and higher water volume delivered by the systems. Moreover, providers of this highly desirable service to patrons have embraced the opportunity to provide high quality filtered/cooled water. Providing such systems introduces a variety of control, maintenance and repair issues addressed by a variety of features described herein in the context of a comprehensive networked system comprising communicatively coupled liquid dispensing stations incorporating/exhibiting a variety of enhanced capabilities exploiting local programmed processing and wireless data network interface communications functionality.

SUMMARY OF THE INVENTION

A liquid dispenser station is described herein. The liquid dispenser station includes a filler including a filler outlet for delivering a liquid. The liquid dispenser station furthermore includes a sensor assembly configured to provide an electronic signal indicative of object presence proximate the filler outlet. The liquid dispenser station furthermore includes a controller configured with a processor and a computer readable medium including computer executable instructions for carrying out a set of liquid dispenser station management operations.

Additionally, a networked system is described for supporting coordinated management of liquid dispenser infrastructure. The networked system includes a networked administrative server including database and application components. Additionally, the networked system includes a plurality of liquid dispenser stations, wherein each one of the dispenser stations comprises: a filler including a filler outlet for delivering a liquid; a sensor assembly configured to provide an electronic signal indicative of object presence proximate the filler outlet; a network communications interface; and a controller configured with a processor and a computer readable medium including computer executable instructions for carrying out a set of liquid dispenser station management operations. The plurality of liquid dispenser stations are configured to communicate with the networked administrative server to provide operational information accumulated by the controller operating in a local supervisory role within the liquid dispenser station. Additionally, the networked administrative server is configured to act upon received operational information received from the liquid dispenser stations by executing administrative tasks including: storing the received operational information, and issuing electronic messages relating to management of the liquid dispenser stations.

BRIEF DESCRIPTION OF THE DRAWINGS

Having generally described illustrative implementation of a system and method of using the system, embodiments of the present invention will now be described with reference to the accompanying figures, wherein:

FIG. 5 is a listing of parameters used by an exemplary IR sensor-based liquid flow control logic for a filler of a liquid dispensing station;

FIG. 8 is a thermal flow model upon which an exemplary predictive liquid temperature generator is based;

FIG. 9 is a data processing flow diagram for rendering a predicted liquid temperature for a cool water reservoir based upon a temperature sensor and a transfer function compensating for systemic delays in the temperature sensor registering a current temperature of the liquid;

FIG. 12 is a further data processing flow diagram for rendering a predicted liquid temperature for a cool water reservoir based upon a temperature sensor and a transfer function compensating for systemic delays in the temperature sensor registering a current temperature of the liquid;

DETAILED DESCRIPTION OF ILLUSTRATIVE EXAMPLES

Figure 1:
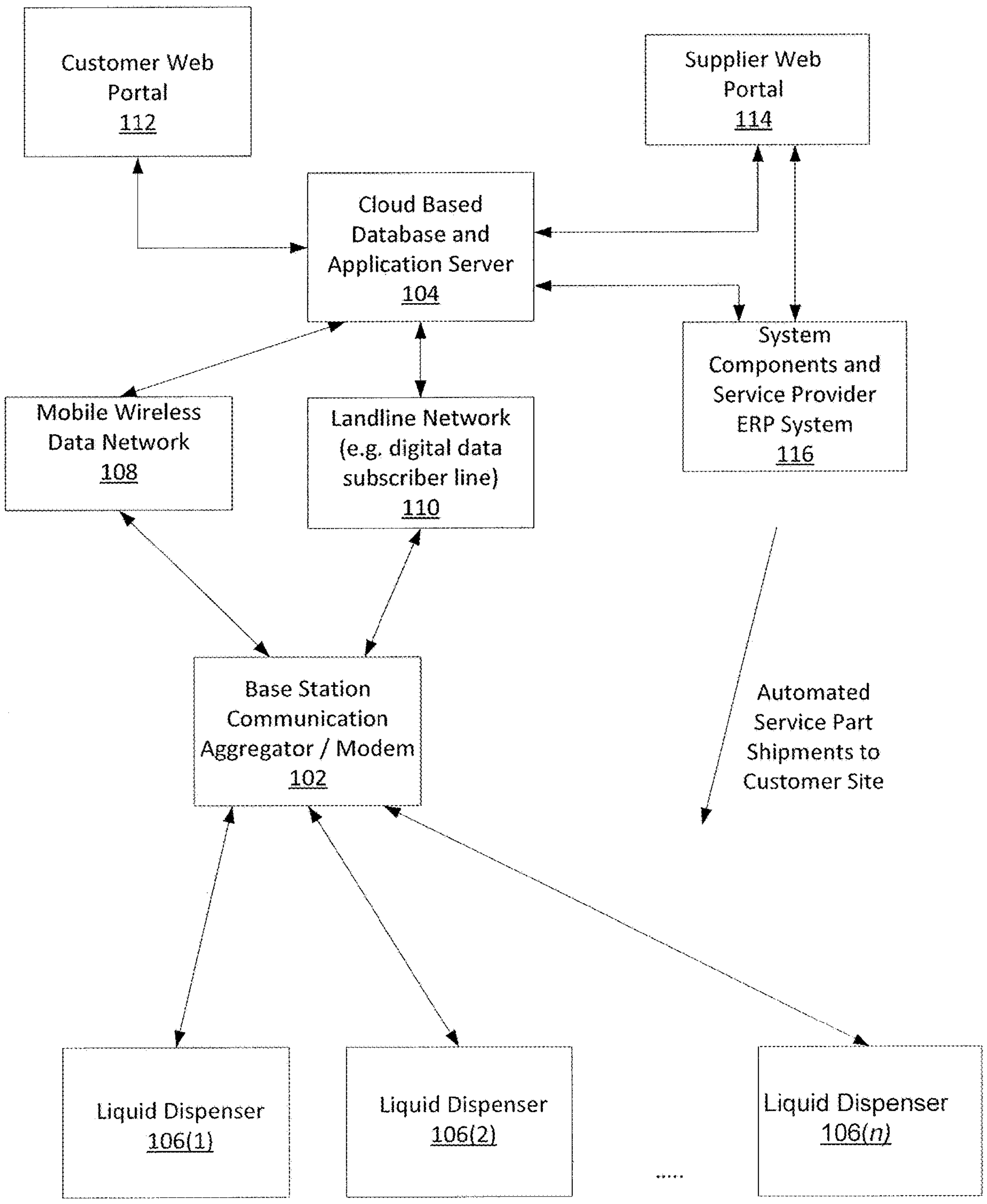
FIG. 1 is a high-level schematic of an exemplary networked system configured to carry out the various described functionalities of an enhanced, networked collection of liquid dispensing stations.

The figures and associated written description provide illustrative examples of systems and methods for dispensing consumable liquids, such as liquid container (e.g. bottle) filling stations now found in a variety of public venues including airports, sports arenas/stadiums, office buildings, museums, train stations, etc. Before describing the drawings, a summary is provided of multiple enhancements and advanced functionalities provided by such systems.

With a fast response refrigeration system in a water dispensing device, traditionally the refrigeration system has used a simple temperature sensing on/off control based on fixed set points. The settings must be approximated based on assumed conditions to account for sensing lag, ambient conditions, and continued cooling after compressor shut off. Traditionally this has been accomplished by a mechanical thermostatic device. In accordance with a control using a predictive algorithm, taking into consideration the historical system response, a microprocessor and electronic thermistor sensor implement a control operation to trigger on/off events of the refrigeration system. In particular, the microprocessor is configured with computer-executable instructions that enable the microprocessor to utilize predictive temperature response, including a specified system time constant and response coefficient.

Enhancements to a liquid dispenser station include incorporating a wireless data network interface that enables the liquid dispenser station to communicate data, such as usage profiles, operating conditions, etc., to a central database and receive remotely issued messages, instructions, and configuration definitions from a remote administrator. Communication may take place via cellular technology (M2M), radio technology (such as proprietary ISM), or wired connection (such as Ethernet/ISP). The central database then uses collected data from the global community of liquid container (e.g. bottle) filling stations to determine both local and global optimizations for refrigeration cycles, water dispensing, and communication. This may increase operational efficiency and reduce energy consumption.

The determined information could be used to apply global settings to the entire installation base, or customized settings for the individual or grouped dispensing devices in a particular location.

Connectivity allows remote setting of parameters, such as water temperature, proximity sensor sensitivity, etc., as well as remote firmware updates. Moreover, the remote connectivity provides a way for remote shutdown of a malfunctioning unit by a remotely located administrator, which could be a programmed supervisory processor/controller or a human operator.

Collecting actual usage data could be used for more accurate prediction of when maintenance could occur, such as cleaning and wear-part replacement. This would be more accurate than simply time-based since it would be tied to actual usage. Accumulated data could also help identify warranty issues, or detect irregular/inappropriate usage or maintenance history.

Enhancements to a liquid dispenser station, operating under the control of a local programmed processor/controller, include utilizing sensors within the liquid dispenser station to monitor various system parameters such as evaporator temperatures, water temperatures, condenser temperatures, compressor temperatures, etc. This allows monitoring of system performance and adjustment via programmed logic on a local microprocessor controller. Systems may be enabled or disabled for brief or extended periods of time to allow normalization or repair. The sensors may also be used for inputs into logical and predictive algorithms to optimize operational time periods, refrigeration or heating cycles, etc. The refrigeration or heating cycles may be modified with parameters to limit minimum run times, minimum off times to prevent short-cycling, adaptive logic parameters, etc. to increase performance, increase component life, reduce overload or stall conditions, etc.

Enhancements to a liquid dispenser station, operating under the control of a local programmed processor/controller, include incorporating closed loop controls into the liquid dispenser station to allow feedback-adjusted system activation of dispensing and temperature control. Examples include fan activation based on condenser temperature to minimize unnecessary energizing of the fan and reduce excessive energy consumption, refrigeration system control based on electronically sensed water temperature, liquid dispensing based on proximity sensing of a bottle or other target, etc. The target sensing closed loop control is unique in that it incorporates movement (based upon a change to a sensor signal, such as an infrared sensor intensity reading) to determine the timing of commencing flow, and constantly monitors the sensor signal to determine its "zero-setting" (i.e. when a target is not within a general detection area). The updating of the "zero-setting" reduces, and potentially eliminates, sensitivity adjustments, thereby making proximity detection more reliable. Additionally, a closed loop control for a condenser fan continuously monitors temperature during non-usage periods to determine ambient temperature, and then using the ambient temperature to reset the on/off threshold temperatures for the condenser fan.

Enhancements to a liquid dispenser station, operating under the control of a local programmed processor/controller, include utilizing historical data and trends to facilitate proactive, operational mode selection, maintenance and repair activities. For example, usage patterns are tracked by a 24 hour clock/7 day calendar to track dispensed volume and then utilize the information to operate the various energy consumption components (e.g., compressor) to operate in an energy saving-mode that reflects periods of time when lower volumes of liquid are dispensed. For example, the system maintains a record of trending condenser maximum temperatures and processes the recorded trending data to identify instances of accumulated debris (e.g. dust), thereby proactively notifying maintenance personnel of a need to clean a condenser prior to a system malfunction or excessive system stress. Such automated detection and notification of maintenance requirements, involving critical system components, increases overall system reliability/efficiency and reduces overall energy consumption by the liquid container filling station. Another exemplary use of recording trending data is tracking of minimum evaporator temperatures, which enables proactive maintenance of the refrigeration system, and thereby increases overall system reliability/efficiency and reduces overall energy consumption by the liquid container filling station. Yet another example is tracking of maximum compressor temperatures, which enables preventative maintenance prior to catastrophic compressor failure.

The enhancements to a liquid dispenser station, operating under the control of a local programmed processor/controller, further include supporting a derated mode of operation to enable the liquid dispenser station to operate at a lower level of operation until the station can be serviced/repaired and prevent damage to other potentially affected components.

Yet other enhancements to a liquid dispenser station, operating under the control of a local programmed processor/controller, relate to using an "adaptive" operation schedule, based upon tracked usage patterns of the bottle filling units, to autonomously and adaptively specify periods of on/off time (to ensure adequate supply while reducing overall energy consumption). Moreover, "adaptive" temperature set points are established based upon historical usage rates (volume per period of time) for particular bottle filling units to enhance system efficiency while maintaining satisfactory supply of cooled liquid.

Enhancements to a liquid dispenser station, operating under the control of a local programmed processor/controller and including network communication capabilities, include configuring the liquid dispenser station to provide both local and remote notification of special operational events. The notifications may be either informational, such as a warning/alert that certain operating limit parameters are being exceeded, or more urgent alarms that indicate a critical event has occurred. The warning/alert notifications may be accompanied by operational adjustments initiated by the local programmed processor/controller of the dispenser station, such as temporarily disabling the refrigeration system. More extreme actions can be initiated by the local processor/controller, such as shutting down operation of the dispenser station until service is performed on the malfunctioning station and the local alarm on the station is reset. The notifications may include local display on the dispenser station, either by a text message on an alphanumeric LCD or similar display, or a graphical or text display of the error code on a graphical display screen. Remote notifications may take the form of email, SMS, or other.

The described system further includes an RFID tag reader that facilitates using RFID tags on a water filters to identify legitimate filters, track their consumption, and prevent "resetting" the filter status—thereby preventing a user from improperly over-using an expired filter by falsely indicating, to the system, that an expired filter is new (by for example, manually resetting an internal counter or dispensed volume monitor). To that end, the bottle filling system and method described herein track water and filter usage, and with an optional internet connection, report that data back to a central database via an intermediately connected base station node. A device on the filter itself stores usage data, so even without internet access, and even if removed and re-installed, the filter can be reliably and consistently marked (and detected) as expired. The use of RFID tagged filters also leveraged to enable proactive tracking and replacement of filters, eliminating time lag between expiry and replacement of specific filters, and facilitating automatic replenishment.

Turning to FIG. 1, an exemplary networked system for carrying out the enhancements described herein is provided. Initially, an overview is provided of the primary components of the exemplary system that together comprise the overall networked dispensing system, including (in addition to a plurality of liquid dispenser stations including local configured processors/controllers) supporting devices, communication networks/links, and servers. Detailed design and functional features for the hardware and software of individual components of the exemplary system are provided herein below.

Initially, a set of system user types are identified and defined. The illustrative example contemplates four types of users of the functionality of services provided by a networked cloud server. Each user type (role) is described below.

Administrators: Administrators are a small group of employees with password-protected access to the web interface of the cloud server. Administrators can manage user accounts, maintain media files, and run reports that provide details about system health and usage. Administrators also manage the uploading and distribution of firmware updates.

Customers: Customers are representatives of building owners who are responsible for purchasing filters, monitoring and maintaining Liquid dispenser stations (LDSs,) and uploading media files for display on their own LDSs. Customer access to the cloud server is essentially a subset of the abilities of Administrators, and limited to information about their own equipment and account.

Commissioner: The Commissioner is a representative of a customer who is responsible for installing and configuring the network aspects of base stations and liquid dispenser stations. Commissioners access devices directly, via a direct, wired connection to a Laptop PC as well as access certain device set up and system diagnostic information via databases maintained by a cloud server.

Consumer: Consumers are anyone operating the dispenser stations to obtain a dispensed liquid (e.g., filling bottles/cups/containers or drinking a liquid dispensed at a consumable liquid dispensing device). It is contemplated that the system tracks the Consumers' usage of the dispenser stations through the use of RFID tags in a card, key fob or water bottle.

Administrators and customers interact with the servers/services provided by the system using web browsers connected to a cloud server via the Internet. A commissioner configures the base station and fluid dispensers (e.g., liquid dispenser stations) using, for example, a laptop computer which is temporarily connected to each fluid dispensing device, base station or accessing the cloud server databases via the Internet. The base station handles data traffic between the cloud server and the fluid dispensers. Base Stations upload usage and event data, and download modified parameter settings, media files and firmware updates.

FIG. 1 illustratively depicts the dispenser stations, networked communication/servers systems and network connections that comprise primary elements of the overall liquid dispensing system. Though not expressly identified in FIG. 1, the system described herein utilizes multiple networks. First, the Internet is utilized to connect base stations (e.g. base station 102), multiple administrator PCs (not shown) and multiple customer PCs (not shown) to a cloud server 104. Second, a local radio network connects liquid dispenser stations (e.g., 106(1), 106(2) . . . **106(*n*))—such as liquid dispenser stations—with the base station 104. Third and fourth networks/connections include temporary, wired connections between a Commissioner's laptop and the base station 104 and the liquid dispenser stations 106(1-*n*) in the form of a local area network or a wireless (e.g., mobile, local, etc.) network providing an intermediary connection to the cloud server 104** via the Internet.

The Internet is a world-wide network that is inherently hostile to security and privacy. All data that the system components transmit over the Internet is therefore encrypted. Administrators and Customers (via a customer web portal 108) connect to the cloud server 104 over the Internet using secure web browser connections. The base station 102 also makes secure connections to the cloud server 104 over the Internet. Such communications may occur, by way of example, via cellular modem via a mobile wireless data network 108 but also potentially via a land-based network 110, using a customer's local network and Internet connection. Since mobile wireless data communications (e.g., cellular data network service) transmissions can be relatively expensive, communications using mobile wireless data network 108 communications are minimized/avoided when possible.

The local radio network connecting the liquid dispenser stations 106 and the base station 102 uses the Industrial, Scientific & Medical (ISM) frequencies. Such local data transfer rates are relatively inexpensive, incurring only the cost of electricity. Therefore, the system architecture emphasizes maximizing the range of the local radio network communication links between the dispenser stations 106 and the base station 106, even when a reduced data transfer rate is required to provide sufficient range. The slow transfers of large media files are mitigated, as much as possible, by simultaneously broadcasting to multiple destinations.

In the third network connection type, a building commissioner connects a personal computer (e.g. a notebook computer), via a local area network (e.g. Ethernet®) connection, to the base station 102 to configure and to check operating status of the base station 102.

In the fourth network connection type, the building commissioner directly connects a Laptop PC the liquid dispenser stations 106(1-*n*) via a physical wire link (e.g. a USB cord), to individually configure, perform maintenance (e.g. review previously recorded trend data streams) and to check operating status of the individual ones of the liquid dispenser stations 106(1-*n*) or to configure or check operating status of the base station 102.

The illustrative networked system comprises a number of distinct networked device types having particular roles in the overall operation of the system. It is noted that the particular configuration is exemplary as the functionality of the various nodes can be divided and/or consolidated in accordance with preferences and needs of a particular installation. The system device (system node) types are described below.

Base Station Node

The base station 102 bridges the Internet and the liquid dispenser stations 106(1-*n*), also referred to herein as liquid dispenser stations or LDSs. The base station 102 connects to the Internet via, for example, a wireless (e.g., cellular modem) or hard wire (e.g. Ethernet) connection. The liquid dispenser stations 106(1-*n*) communicate with the base station 102 using, for example, a local radio network on the Industrial, Scientific and Medical (ISM) bands. The base station 102 is, by way of example, also a proxy server and file server for the liquid dispenser stations 106(1-*n*). The base station 102 aggregates and relays usage and event information from the liquid dispenser stations 106(1-*n*) to the cloud server 104, and downloads media files and other types of files, (such as software upgrades,) from the cloud server 104, then distributes the files to the liquid dispenser stations 106(1-*n*). The base station 102 can also receive text messages from the cloud server 104, as an indication that the base station 102 should immediately connect to the cloud server 104, to report current operating/alarm conditions and/or receive commands/instructions to take remedial/proactive actions to modify the operation of one or more of the liquid dispenser stations 106(1-*n*) to modify one or more operational parameters.

The base station 102 includes the following external interfaces: Ethernet, Local Radio Network, Cellular Modem, Status LEDs, JTAG and Debug, USB, and Power Entry.

The following summarizes exemplary functionality carried out by programmed functional components (identified/described below) of the base station 102. In general, the base station 102 functionality includes:

- Initiating (automatically) communication to all dispenser stations 106 on the local radio network;
- Authenticating dispenser stations 106 and handles data traffic only for those previously registered/associated with the base station 102;
- Communicating via local wireless with the dispenser stations and collects/distributes data;
- Communicating via the mobile wireless data network 108 (or landline network 110) with the cloud server 104 daily to upload dispenser station data and download dispenser station configuration updates;
- Communicating via wired Ethernet with "cloud" frequently (e.g. every few minutes) to upload unit data and download dispenser station updates;
- Maintaining a local copy of data and media files sent to dispenser stations 106;
- Keeping local aggregated data collected from dispenser stations 106;
- Providing a commissioning interface to aid placement of the base station 102;
- Tracking communication and sending alerts for failed units, for example, "Can't communicate for x hours/days";
- Determining approximate location via cell triangulation;
- Using displayed LEDs to indicate: Local network connection and traffic, an Internet network connection and traffic, and system power;
- Periodically "pinging" units to confirm functional state of radio links to individual dispenser stations; and
- Providing a method to load initial content at factory.

The aforementioned functionality of the base station 102 is further described with reference to programmed components of the base station 102 described herein below.

The base station 102 includes a base station manager component. The base station manager is the master thread in the base station. The base station manager interacts with most or all other programmed components executing on the base station 102 and coordinates timing and data passing through the system.

The base station manager is configured to carry out functionality including:

(A) Managing high-level local radio status and connections with dispenser stations, including:

(1) Transmitting base station status messages to the dispenser stations. This message is used once a LDS is connected for time, commands, status, media schedule and firmware versions, etc. It is also used to ACK status and statistics messages from the LDS units.

(2) Authenticating connection requests issued by the dispenser stations 106. This is partially done at the radio layer.

(3) Managing link quality of direct and/or indirect links between the base station 102 and the dispenser stations 106 to enable the dispenser stations 106 to send and receive data to/from the base station 102.

(B) Using a file server to store, recall and manage files including: hourly statistics data on a dispenser station basis, error conditions, media files for the dispenser stations, schedule files for the dispenser stations, firmware files for the base station and dispenser stations.

(C) Using a Web client manager to retrieve and send data to/from the cloud server 104. This includes logging into the cloud server 104 and thereafter: synchronizing data (events, statistics, status, media schedules, media, firmware images, etc.), obtaining a listing of valid dispenser stations.

(D) Using a commissioning manager to locally monitor, control, configure and update the programmed components of the base station 102.

The base station 102 includes a cloud client manager module component that periodically connects to the Cloud Server to synchronize data and media files on behalf of the liquid dispenser stations. The Base Station also connects in response to events reported by a liquid dispenser station, and when triggered by the receipt of an SMS message sent from the Cloud Server. Regardless of the trigger for the connection, the Cloud Client Manager follows the same data synchronization steps outlined below.

Data Synchronization with "sync" Web Service. Data uploaded to the cloud server 104 via the "sync" data synchronization service includes the following operations:

1. Issuing an HTTP call to the "sync" web service;
2. Providing a valid username and password to the cloud server 104;
3. Uploading collected dispenser station data, including for example: status, usage, temperature measurements, display log, and events;
4. Downloading all available data for the Base Station and any liquid dispenser stations, including for example: new media schedules, commands for liquid dispenser stations, firmware update notifications for both Base Stations and liquid dispenser stations, and current UTC timestamp;
5. Examining all new media schedules, and queue downloads for any files that are not currently stored in the file cache; and
6. Pushing any new media schedules to the liquid dispenser stations.

With each call to the "sync" web service, the Cloud Client Manager uploads all collected dispenser station data, and following a successful synchronization the cloud client manager can erase the local copy of the uploaded data (or create a new synchronization file/record) to start recording anew for the next synchronization.

File Downloads from the "file" Web Service. For each file queued for download, the cloud client manager calls the "file" web service of the cloud server 104, passes a valid username and password, and requests a file by passing the 4-byte file ID. For valid download requests, the cloud server 104 responds by sending a binary file to the base station 102 as an HTTP response. For invalid requests, the cloud server sends an appropriate HTTP status code, such as "404" for a "file not found" error notification. File downloads from the cloud server 102 web service includes media files for a Graphic Display Board (GDB) on the dispenser stations 106, and firmware images for both the base station 102 and the GDBs.

Liquid Dispenser filling station Authorization via "fill_stations" web service. The cloud client manager module of the base station 102 only allows authorized (registered) ones of the liquid dispenser stations 106 (also referred to herein as LDSs) to connect to the base station 102 for communications over the local radio network. When a new LDS is discovered on the local radio network, the cloud client manager can call the "fill_stations" web service, passing a valid username and password, and the cloud server 104 will return a Javascript Object Notation (JSON) encoded list of valid LDS identifications. Any LDS identified on that list should be allowed to connect over the local radio network to the base station 102.

Data Synchronization Scheduling. The base station 102 synchronizes with the cloud server 104, for example, during a predetermined interval of the day (e.g. 2 am to 6 am local time) to take advantage of, for example, lower carrier rates and reduce network congestion. A base station 102, in an exemplary embodiment, performs two synchronizing operations: calling the "sync" web service to send the records/states and retrieve any new media schedules or image upgrade, and downloading any new files which are not locally stored on the base station.

To avoid conflicts arising from simultaneous requests by multiple base stations to the cloud server 104 for synchronization, the base station 102 calls to the "sync" web service of the cloud server 104 at a random time within the predetermined interval of the day. The random time is calculated by the base station 102. Once data synchronization is complete, the cloud client manager of the base station 102 starts a timer, and will typically not connect again until 24 hours after that time. Since the timer starts at the end of a synchronization operation, each connection is a little more than 24 hours after a start of a previous synchronization. If the 24 hour period extends outside the configured sync sub-interval, a new sync time is randomly selected. The cloud server 104 is configured to handle potentially many thousands of base stations (e.g. base station 102), and ideally, the connections will be spread relatively evenly over a preferred synchronization sub-interval (e.g. 2-6 AM local time for the base station).

There are two exceptions to the above-described synchronization timing scheme: (1) when one of the dispenser stations 106 reports an event, and (2) when a Simple Message Service (SMS) "text" is received from the cloud server 104 over the mobile wireless data network 108. Immediately following either of these two triggering event, the cloud client manager of the base station 102 begins data synchronization with the cloud server 104. Like any other data synchronization, upon completion, the cloud client manager reschedules to within the predetermined synchronization service time interval.

Event Hold-off Timer. Whenever the cloud client manager of the base station 102 initiates data synchronization because of an event reported by one of the dispenser stations 106, the manager starts a five minute Event Hold-Off Timer. No data synchronizations triggered by further events shall begin before the hold-off timer expires. A trigger by a Simple Message Service (SMS) "text" does not fall under this condition. Regardless of how recent the last data synchronization, an SMS triggers an immediate synchronization. This aspect of the overall synchronization algorithm carried out by the base station 102 serves two purposes: it prevents dispenser stations from "spamming" the cloud server 104. Second, the base station 102 remains as responsive as possible to requests from the server.

The base station 102 includes a local radio manager component that is responsible for maintaining the radio connections to the multiple LDS units. Among other things, the local radio manager is configured to ensure that only authorized LDSs are permitted to connect with the base station 102. Since only broadcast messages are used in the local radio network through which the base station and liquid dispenser stations 106 communicate, authorization occurs using a combination of network IDs, security and LDS serial number authorization lists. The local radio manager relays files to the LDS units (Broadcast to all to attempt to share bandwidth) and the LDS units have the option to store these broadcast files—or ignore them. The LDSs store the files if the LDSs know that they need them, such as by looking for schedule ID chunks as indicated in an LDS status message or for media file chunks as indicated in the schedule file. The local radio manager accepts a variety of LDS status and statistics messages that are ACK'd. The ACK guarantees that the LDS status and statistics data has been received and can be deleted to make room for more data on the LDS. An optional optimization could be to have media files pushed spontaneously by the base station 102 to the dispenser stations 106. Such optimization would require the LDSs to already have a schedule that contains identifications of the new files. Otherwise the LDSs would not recognize, and thus discard, the file chunks.

The base station 102 includes a file server manager component that responds to LDS file and file chunk requests and broadcasts the requested file chunks over the local radio network to the BFSs. If the base station 102 does not have the file locally, the file server manager adds an identification of the file to a list of files to request the next time that the base station connects to the cloud server 104. When multiple LDSs finish their file and file chunk requests, the base station 102 combines all the requests into a single file chunk request list, taking into account files that the base station 102 already possesses. The file server manager initiates a broadcast by the base station 102 of all the requested file chunks to the LDSs. The LDSs save the broadcast file chunks that are needed by the individual LDSs and discard the chunks that are not needed. The broadcast file chunks are not ACK'd by the individual LDSs. Instead, the individual LDSs simply reevaluate missing file chunks (at the end of the broadcasting by the base station 102) as determined by its media schedule and formulates a new file chunk request. The follow-up request by the individual LDSs is gated to a minimum time so as to not flood the base station 102 with repeated file requests by the LDSs. The LDS also waits for the base station 102 to stop sending the current file chunk list before requesting more files.

The above-described exemplary file chunk request/response arrangement permits an LDS to request an entire file or up to 41*8 file chunks. File chunks are individually selected by a file request message containing a file number with a chunk offset. This is followed by up to 41*8 bits of offsets from this chunk (offset 0 to offset 327). Each bit will contain a 1 if that particular chunk offset is needed or a 0 if it is not needed. The LDSs send a file request message to ask for and receive each file and file chunk that it needs. It is up to the individual LDS controllers to determine whether to send multiple file request messages in a communications window. Multiple LDSs may ask for a same file or file chunk. To improve the efficiency of file transfer, the LDSs could randomization file chunk requests at a given time. This decision could also be based on the maximum number of chunk offsets out of up to 328 that an LDS may request in a request message.

Range Extender Node (Not Depicted in FIG. 1)

A range extender (RE), which is not depicted in FIG. 1, is a network device that has a radio that communicates over the same local radio network as the base station 102 and liquid dispenser stations (LDSs) 106, and repeats every packet that it receives from any of the base station 102 and dispenser stations 106. In this way, a strategically placed range extender node connects LDSs that are otherwise too distant to communicate with the base station via direct radio communications. The range extender node functionality is incorporated into one or more of the liquid dispensers 106 nodes in an exemplary embodiment.

Cloud Server Node (Cloud Server 104 in FIG. 1)

The cloud server 104 is a combination of database and communication server functionalities carried out, in exemplary embodiments, by one or more networked servers having Internet connectivity. To the outside world, the set of physical servers appears to be a single server node (having a single Internet address/name). The cloud server 104 includes a variety of communications channels including ones support email and text messages.

With regard the "database" aspect of the cloud server 104, the following is an exemplary listing of tables maintained by the cloud server 104:

1. Customers: Representatives of the building owners where the dispenser stations are installed.
2. Liquid dispenser stations: Tracks all commissioned liquid dispenser stations.
3. Base Stations: A table of Base Stations that connect to the cloud server 104. Each is associated with a Customer.
4. Orders: Filters or other products ordered by Customers and fulfilled via automated order fulfillment (picking, packing, and shipping) via interaction with a system components and service provider enterprise resource planning (ERP) system 116.
5. Alerts: A log of alerts reported by LDSs.
6. Consumers: These are actual users of the liquid dispenser stations, most likely identified by an RFID key chain fob or card. May be incorporated in systems where payment or consumer-specific use tracking is implemented. Alternative embodiments could use chip-enabled (EMV) credit cards, mobile payment/digital wallet services, or other identification means.

The cloud server 104 supports the following administrative pages (accessed via a supplier Web portal 114):

1. Custom reports exported to a file which can be imported by other software applications.
2. Standard Reports. Given a date range, a report is produced listing: alerts, bottles saved (green ticker), filter status, LDS status, liquid dispensed (in gallons), number of bottle fills, number of bubbler uses
3. Run Standard Report, defined in #2, for an individual Customer or individual liquid dispenser station.
4. Push new media files to liquid dispenser stations.
5. Push new firmware images to Liquid dispenser stations.
6. Push new firmware images to Base Stations.
7. Call log (ticketing system) tied to unit/customer DB.
8. Online chat with customer/service tech.
9. Forced communication prompt triggers connection by the base station 102 to Cloud server 104 (limit number of times).
10. Manage user permissions.
11. Diagnostics.
12. System Settings.
13. Equipment Inventory.
14. Account Maintenance.

The cloud server 104 supports the following pages through which a customer user may access the data of the cloud server 104 database (via a customer web portal 112):

1. Portal to order system.
2. Customer Station Report. This report will have an "export" button that will download an export file which can be opened as a spreadsheet. For each Station, the following values are reported: bottles saved (Green Ticker), filter status, and system diagnostics
3. Alerts.
4. Contact Tech Services. Info page displaying phone #, chat instructions, etc.
5. FAQ.
6. Subscription Details. Customers can review past payments, update their contact info, update their payment info, etc.
7. Customer Dashboard. A page that is dynamically able to be configured by the individual customer to show information of greatest individual interest. A set of "widgets" may be dynamically arranged on a page to meet the specific needs of individual customers.
8. Settings Page. Settings include: sleep schedule, filter notification trigger, filter order trigger,
9. Links to tech docs, troubleshooting guides.
10. Media Upload Tool. Customers can upload media files for their Stations and configure these files into scheduled "play lists" for specific or customer-wide display.
11. Media Review Tool. Customers can review all content in cloud associated to their account and grant approval status to provide distribution security.
12. Customer Management. Customers can change their passwords and other account information.
13. Customer Profile Maintenance. Customers can change their address, contact name, preferred language, etc.
14. Diagnostics.
15. Equipment Inventory.

The functionality of the cloud server 104 is further described with reference to a number of provided exemplary "use cases" (UC-SRV #001-007) provided in the Tables that follow.

TABLE 1

| Synchronize Base Station and Cloud Server Data UC-SRV #001 | |
|---|---|
| Name | Synchronize Bottle Filling Station and Cloud Server data. |
| Scope | Web Services |
| Primary Actor | Base Station |
| Stakeholder and Interests | Base Station wants to push operating status, filter information, traffic logs and event logs up to server.<br>Server wants to push media schedules, media files and firmware updates to Base Station.<br>Customs and Elkay want online access of up-to-date information. |
| Preconditions | Base Station can access web services with a valid username and password. Method of internet access could be cellular modem or Ethernet. |
| Success Guarantee | Data is synchronized between Base Station and Cloud Server. |
| Main Success Scenario | 1. Base Station logs in to web services.<br>2. Base Station generates a sparsely-populated data structure, containing operating status, filter information, traffic logs, and event logs for all the Bottle Filling Stations on its network.<br>3. Base Station pushes data structure to the server.<br>4. Base Station receives, in response, a data structure from the server, containing media schedules and possibly, a notice of a firmware update.<br>5. Base Station compares locally-stored list of media files with all known media schedules, and downloads any needed files.<br>6. Base Station compares firmware update notification with current firmware version, and, if needed, downloads a new firmware and flashes itself. |
| Extensions | If the station has indicated an error state:<br>Step 3:<br>a. Server sends an email to both the Customer and Elkay<br>b. Customers and Administrators can view a list of stations, and see which currently indicate an error state. |
| Frequency of Occurrence | Data is synchronized daily |

TABLE 2

| Estimate When Filters Will Need Replacement UC-SRV #002 | |
|---|---|
| Name | Estimate when filters will need replacement. |
| Scope | Web Application |
| Primary Actor | Customer |
| Stakeholder and Interests | Customer wants to know how many filters will expire soon. |
| Preconditions | Customer can access web application with a valid username and password. |
| Success Guarantee | Customer learns how many filters are likely to expire in the next month, quarter and year. |

TABLE 2-continued

| Estimate When Filters Will Need Replacement UC-SRV #002 | |
|---|---|
| Main Success Scenario | 1. Customer logs in to web application.<br>2. Customer is presented with a list of all Bottle Filling Stations and filters.<br>3. Customer clicks the "Estimate Filter Replacement" link.<br>4. Customer is presented with a schedule listing the count of filers that are soon to expire.<br>5. Customer can easily see how many filters will expire in the next month, quarter and year. |
| Frequency of Occurrence | Customer checks report monthly. |

TABLE 3

| Disable a currently running media file. UC-SRV #003 | |
|---|---|
| Name | Disable a currently running media file. |
| Scope | Web Application |
| Primary Actor | Customer |
| Stakeholder and Interests | Customer wants to quickly and easily remove a media file from rotation. For example, someone from the school board says parents are complaining about an advertisement for a certain product. |
| Preconditions | Customer can access web application with a valid username and password. |
| Success Guarantee | Customer can find the specific media file, indicate it should be removed, and verify that it no longer displays. |
| Main Success Scenario | 1. Customer logs in to web application.<br>2. Customer is presented with a list of all media files currently in rotation on their Bottle Filling Stations.<br>3. Customer views the media files.<br>4. Customer clicks the "Disable" button for one or more media files.<br>5. The server re-generates a new media schedule for the customer's Bottle Filling Stations.<br>6. The server queues up the new media schedule and sends a "push" notification to the appropriate Base Station.<br>7. The Base Station receives the notification, and initiates synchronization with the server.<br>8. The server sends an email message to the customer, indicating which media files were either enabled or disabled.<br>9. For any disabled media files in the list, the status will be displayed as either "disabled" or "disabled pending update", depending on whether or not the station has synchronized data since the status was changed. |
| Frequency of Occurrence | Rarely. |

TABLE 4

| Estimate how many filters to manufacture. UC-SRV #004 | |
|---|---|
| Name | Estimate how many filters to manufacture. |
| Scope | Web Application |
| Primary Actor | Administrator |
| Stakeholder and Interests | Elkay wants to optimize filter manufacturing. |
| Preconditions | Administrator can access web application with a valid username and password. |
| Success Guarantee | Administrator can view the "Estimate Filter Sales" report. |
| Main Success Scenario | 1. Administrator logs in to web application.<br>2. Administrator clicks the "Estimate Filter Sales" link.<br>3. Administrator is presented with a report that enumerates how many filters are estimated to expire in the next month, quarter and year. |
| Frequency of Occurrence | Weekly |

TABLE 5

| Publish a Media Schedule UC-SRV #005 | |
|---|---|
| Name | Publish a media file schedule. |
| Scope | Web Application |
| Primary Actor | Administrator |
| Stakeholder and Interests | Administrator wants to publish media files to Bottle Filling Stations. |
| Preconditions | Administrator can access web application with a valid username and password. |
| Success Guarantee | Administrator can collect a set of media files into a schedule, and publish that schedule to Bottle Filling Stations. |
| Main Success Scenario | 1. Administrator logs in to web application.<br>2. Administrator can upload any new media files to the new server.<br>3. Administrator navigates to list of media schedules.<br>4. Administrator clicks "Add New Schedule" button.<br>5. Administrator fills out a form to give start/end dates, etc., for the new schedule.<br>6. Administrator can indicate which existing media files to add to the new schedule.<br>7. Administrator can search the list of customers to easily select just one or many customers grouped by some attribute, such as city, state or perhaps type of customer, such as school or business. Once selected, the administrator publishes the new media schedule to those customers.<br>8. The server generates media schedules for the selected customers' Bottle Filling Stations. |
| Frequency of Occurrence | Weekly |

TABLE 6

| Monitor system health UC-SRV #006 | |
|---|---|
| Name | Monitor system health. |
| Scope | Web Application |
| Primary Actor | Administrator |
| Stakeholder and Interests | Administrator wants to know if there are any current problems. |
| Preconditions | Administrator can access web application with a valid username and password. |
| Success Guarantee | Administrator can assess whether or not there are any current problems with the system. |
| Main Success Scenario | 1. Administrator logs in to web application.<br>2. Administrator navigates to list of customers and Bottle Filling Stations (BFSs).<br>3. Administrator uses list controls to hide all BFSs that are operating normally.<br>4. The administrator is presented with a list of BFSs that are not currently operational. |
| Frequency of Occurrence | Daily |

TABLE 7

| Generate Green Statistics Report UC-SRV #007 | |
|---|---|
| Name | Generate green tickler report. |
| Scope | Web Application |
| Primary Actor | Customer, Administrator |
| Stakeholder and Interests | User wants to see how "green" the system is. |
| Preconditions | User can access web application with a valid username and password. |
| Success Guarantee | User is presented with green statistics report. |
| Main Success Scenario | 1. Customer logs in to web application.<br>2. Customer navigates to "Green Statistics" report.<br>3. Customer is presented with various statistics for all their Bottle Filling Stations. |
| Extensions | If the user is administrator.<br>Step 1<br>a. Administrator is presented with various statistics for all customers and all Bottle Filling Stations. |
| Frequency of Occurrence | Weekly |

Having described a set of use cases describing functionality incorporated into the combined database and communications components of the cloud server 104, attention is directed to Web-based services supported by the cloud server 104 for facilitating carrying out the above-summarized functionality of the use cases. The Web (Internet) application of the cloud server 104 provides a number of web services for the liquid dispenser stations (LDSs)—provided via the base station 102. By way of example, the web services are provided in the form of machine-readable/executable web pages. The web services, by way of example, follow the Representational State Transfer (REST) software architecture style. The web services of the cloud server 104 are named from the point of view of the LDS, such that an "upload" represents a data transfer from the LDS to the web server.

A Data Synchronization service of the cloud server 104 is executed, for the base station 102, approximately (as previously explained, slightly greater than) every 24 hours. The base station 102 synchronizes data with the cloud server 104 on behalf of the registered liquid dispenser stations 106(1-*n*). The base station 102 accumulates data from the registered ones of the liquid dispenser stations 106(1-*n*) on the base station 102's local radio network. Thereafter, the base station 102 uploads station traffic (usage) data and status information to the cloud server 104 on behalf of the registered liquid dispenser stations 106(1-*n*). The base station 102 also downloads media schedules, commands and firmware update notices for the LDSs. The base station 102 also connects whenever one of the liquid dispenser stations 106(1-*n*) reports an event, or when requested by the cloud server 104.

While the various database synchronization transactions between the cloud server 104 and the base station 102 on behalf of the registered ones of the liquid dispenser stations 106(1-*n*) are logically separate, in an exemplary synchronization scheme the transactions are bundled in a single call by the base station 102 to the cloud server 104 to minimize bandwidth usage during synchronization in view of synchronization communication overhead. Thus, in one secure (e.g. HTTPS) transaction, the base station 102 sends a JavaScript Object Notation (JSON) data structure or similarly encoded structure such as XML, etc., containing (for each of the registered ones of the liquid dispenser stations 106(1-*n*)) traffic data and status. The base station 102 receives, as a reply from the cloud server 104, download synchronization data (for both the base station and any registered LDSs) in the form of an encoded data structure containing both a media schedule and any firmware update notices. The reply may also include a notification of a next scheduled synchronization time.

In addition to the periodic (e.g. daily) synchronizations, if one of the registered liquid dispenser stations 106(1-*n*) detects a serious event that should be reported immediately, such as over-heating, then the liquid dispenser station does so without waiting for the next scheduled communication with the base station 102. After receiving the urgent event notification from one of the registered dispenser stations 106(1-*n*), the base station 102, without waiting for expiration of a period update timer for performing non-urgent synchronizations, connects to the cloud server 104 and synchronizes data. In this way, the cloud server 104 is promptly notified, and can take similarly expedited remedial actions, with regard to any problem for which immediate response/attention is desired.

When the cloud server 104 receives an urgent event notification from the base station 104 on behalf of a particular one of the registered liquid dispenser stations 106(1-*n*), the cloud server 104 generates and then issues an event-specific email notification or other message type (such as an SMS message) to configured accounts designated for both the customer and supplier.

The synchronization information provided by the base station 102 to the cloud server 104 includes uploaded dispenser station traffic data. The uploaded dispenser traffic data includes the following information reported periodically (e.g. hourly) by individual ones of the dispenser stations 106(1-*n*) to the base station 102.

1. Operating Status: Exemplary current operating status types of the station include: new, working, warning, error, disabled, or failure.
2. Number of Fills: any sufficiently long dispenser activation is counted as a "fill" operation, and the liquid dispenser station reports a number of fills during the reporting period.
3. Number of Bubbler Drinks: dispenser station reports the number of times the bubbler is used during the reporting period.
4. Dispensed Volume: dispenser station reports the total volume of liquid dispensed during the reporting period.
5. Number of Media File Presentations: dispenser station reports, for each media file, the number of times that media file was displayed during the reporting period (e.g., displayed advertisements—for purposes of an accounting for an advertising client).
6. Water Temperatures: dispenser station records/reports for each reporting period the following temperature values for the dispensed liquid: minimum, average, and maximum.
7. Other Temperatures: dispenser station records/reports for each reporting period: maximum compressor temperature and maximum condenser temperature. These last two recorded/temperatures are for a previous 24 hours.

Thus, in an illustrative example, the dispenser stations report the following information to the cloud server 104, via the base stations every hour: Volume of liquid dispensed, fills (count), bubbler drinks (count), minimum water temperature, maximum water temperature, and average water temperature.

In the illustrative example, the dispenser stations 106(1-*n*) report the following information to the cloud server 104, via the base station 102 every day: maximum compressor temperature, maximum condenser temperature, and filter percentage used.

In an illustrative example, the dispenser stations 106(1-*n*) report the following current dispenser station operating status to the cloud server 104, via the base station 102: New (not yet commissioned), Normal (operating normally), Warning (operating, but recently detected a Warning), Error (operating, but recently detected an Error), Off (not dispensing water).

In an illustrative example, the dispenser stations report the following events without delay, to the cloud server 104 via the base stations: overheating and watchdog timer reset.

Attention is now directed to the content downloaded from the cloud server 104 to the individual dispenser stations 106(1-*n*) via the base station 102. By way of example, the base station downloads:

1. Media Schedules: new media schedules.
2. Firmware Update Notices: new firmware update notices for either the Base Station or Liquid dispenser stations.

3. Commands: cloud server 104 remotely enables/disables/configures/tunes the dispensing or other functions of physical (liquid dispensing, cooling, etc.) and/or computational (accounting, reporting, messaging, etc.) components the dispenser stations 106(1-*n*).

Additionally, the cloud server 104 supports a "Get liquid dispenser stations" service. The base station 102 calls this web service to download a list of all the liquid dispenser stations 106 owned by the base station's customer. The base station 102 uses the list to determine which ones of a set of detected communicating liquid dispenser stations are permitted to connect to the base station 102. There could be a situation where another customer has Liquid dispenser stations within wireless range, and must be prevented from connecting to someone else's Base Station.

The cloud server 104 supports web services/pages directed to customer support and accessed via the customer web portal 112. The web application of the cloud server 104 provides a number of web services for customers to monitor and manage their subscriptions, stations, media files, and media schedules. Customers view detailed traffic information about individually identified fillers, bubblers and water filters for each station. Customers create and preview the list of all media files queued up for rotation for their stations, and can also "veto" media files that are currently designated to be downloaded to the dispenser stations.

Particular, exemplary, customer pages accessed via the customer Web portal 112 include:

Customer Access Privileges Page: Customers may want to give access to more than one person in their organization. There may be, for example, someone responsible for media content, someone else responsible for maintenance and filter replacement, and someone else responsible for managing subscriptions and payments. Customers may choose to have just one person log in to the system, and that person will need to perform all functions. To that end, it will be possible for a single customer to have multiple logins, with one or more of the following information access types/levels: Monitoring, Control, Media, Financial, and All.

Subscription Manager Page: Customers use this page to manage their subscriptions. There are two different exemplary subscription levels. A remote monitor subscription incurs a charge which is billed monthly to the Customer's credit card. This pays for the base station 102 services and access to customer pages. A filter replacement subscription is an upgrade to the remote monitor subscription. The filter replacement subscription is billed monthly to the customer account, and includes the monitoring service. For the filter replacement subscription, when the system detects that a filter needs replacement, a new filter will be automatically shipped to the location of the liquid dispenser needing the new filter (via the system components and service provider ERP system 116), and the customer account is charged for the filter and associated shipping costs. Many other subscription configurations are possible and envisioned.

Base Station Manager Page: Customers use this page to access sub-pages to manage certain aspects of multiple base stations owned by the same customer. A base station list, provided via the Base Station Manager Page, is a searchable, sortable list of all base stations owned by the customer. From this list, users can drill-down to details for each owned base station. The list displays: name, location, serial #, status, etc. A base station detail page presents detailed information about a particular base station. A base station edit page enables customers use this form to edit the name and location of a particular one of the multiple owned base stations.

A Liquid Dispenser Station Manager Page: Customers use this page access sub-pages to manage certain aspects of their Liquid dispenser stations. This page includes a Liquid dispenser station list that is a searchable and sortable list of all dispenser stations owned by the customer. From this list, users can drill-down to details for each station. The list displays: station name, location, serial #, status, filter model, filter serial #, "replace before" date, etc. A liquid dispenser station detail page presents detailed information about the bottle filler, bubbler and water filter for a particular Liquid dispenser station. A liquid dispenser station Edit form enables customers to edit the name and location of their various Liquid dispenser stations.

A Filter Expiry Schedule: lists an expiry date of the filters attached to each liquid dispenser station owned by the customer. A customer can use this report to decide how many filters to order or to plan future budgetary expenditures. The count of replacement filters is summed by month, quarter and year, to align with different budgeting periods.

Liquid dispenser station Report: Given a date range, this report lists all usage information for the Liquid dispenser stations owned by the Customer. It also lists any events recorded. The report has an export button which downloads a file that can be opened by a spreadsheet application.

Liquid dispenser station Alerts Report: This report lists all recent alerts for the liquid dispenser stations owned by the Customer in a prioritized order. Those alerts identified as higher priority are shown first to enable fast response to critical events.

The cloud server 104 supports web services/pages directed to administrator support and accessed via the supplier web portal 114. The administrator pages are used to manage customer accounts, monitor liquid dispenser stations, manage media files, and check the health of system components. In contrast to customer-limited views, views of information via the supplier web portal 114 can encompass all stations in the entire system, just the stations for a particular customer, or any individual station.

Customer Base Station List: a page including a list of customers and base stations associated with each customer, including links to detailed views including information such as status, date of last synchronization, etc.

Customer Liquid dispenser station List: a page including a list of customers and liquid dispenser stations associated with each customer, including links to detailed views of each listed liquid dispenser station including information such as status, filter info, event logs, traffic data and media schedules.

Filter Demand Forecast: The cloud server maintains a database including filter information such that one can determine, from information maintained on the cloud server 104, the status of most filters currently in use. The cloud server 104 is also able provide information to the supplier enabling the supplier to observe traffic patterns for each liquid dispenser station. The cloud server 104, upon request via the supplier web portal 114, can combine this information to extrapolate a likely date that a particular filter will expire. The Filter Demand Forecast aggregates data from all the filters currently in use to predict demand for filters over the next month, quarter and year.

Subscription Fee Reports: Additionally, for any customer who signed up for either the remote monitor or filter replacement subscription, the credit account processor, whenever possible, will automatically bill the customer's account for the monthly subscription fee. Given a date range, this report lists the status of all customer subscriptions and payments. Administrators use this report to see which customer accounts are still in good standing, or have rejected/declined electronic payment requests.

Force Communication Command: Administrators use this function to trigger the data synchronization step between a Base Station, its Liquid dispenser stations, and the Cloud server 104. When an administrator uses this function, the Cloud server 104 sends a Simple Message Service (SMS) "text" message to the Base Station, indicating that the Base Station should call the data synchronization web service.

Base Station Communication Report: This report lists all Base Stations which have not reported to the Cloud server 104 for a given period of time. An administrator can use this report to diagnose problems with Customer network connectivity and equipment.

Exporting Reports: The various reports available to administrators feature a button that can be used to download a file containing the information in the report. The file can be opened in a desktop application like Excel, Crystal Reports, or many other software tools.

The cloud server 104 supports web services/pages directed to staff support and accessed via the supplier web portal 114. The staff support pages enable supplier employees to provide technical support to customers. Although staff members share the login page with administrators, once logged in, they only have access to the Support Call Manager pages on the supplier web portal 114.

Support Call Manager page: The support call manager page is a typical tech support ticketing system. Customers use a form to submit a support call request, and staff members are notified via email of the support call request. The email contains a link which leads to the detail view of the support call request. The support call manager page includes a support call list enumerating support call requests. Staff members can use this page as a to-do list. Staff members use a Support Call Add/Edit form to make notes on existing support call request records, and to mark them completed. A support call detail page lists all the notes and activity for a specific Support Call.

The cloud server 104 supports web services/pages directed to commissioning components of the networked system and accessed via the supplier web portal 114 and the customer web portal 112. The cloud server 104 must be able to associate particular base stations and corresponding networked liquid dispenser stations with particular customers. The cloud server 104 must also be able to associate particular liquid dispenser stations with corresponding base stations, so that it knows where to send messages (e.g. SMS messages). Both administrators and customers use the Commissioning pages to associate both base stations and liquid dispenser stations with a particular customer account. After a customer decides that they want the communication package, an administrator creates a Customer account and associates the base station(s) with that account. Following the administrator's creation of the base station record entry under the identified Customer, the Customer associates liquid dispenser stations with their own account and a particular base station under the account.

Base Station Commissioning page: Base stations need to be associated with a Customer account. Administrators enter a serial number of any new base stations for a particular Customer, and the cloud server 104 web application adds records to track the base stations assigned to the particular Customer. Once the records have been added, then certain fields will be editable by Customers, for example, the name and location fields. Base stations need a username and password to communicate with the cloud server 104. The base stations dynamically create their own user names and passwords based on authentication algorithms shared with the cloud server logic.

Liquid dispenser station Commissioning page: Liquid dispenser stations need to be associated with a Customer account. The Customer will enter the serial numbers of each Liquid dispenser station they want to see on the system.

The cloud server 104 furthermore includes a firmware update manager component that is used by Administrators to upload new firmware images and distribute them to customer equipment. Both the liquid dispenser stations 106(1-*n*) and the base station 102 are capable of receiving such remote firmware upgrades.

Firmware Uploader: Administrators use this page to upload new firmware images, indicating whether the image is for a Liquid dispenser station or a Base Station. Staff will also indicate a firmware version number and an effective date.

Firmware Publisher: Administrators use this form to indicate which Customers should receive firmware updates. The interface presents a searchable list of Customers, and for each Customer, indicates the current firmware version their equipment is running. Staff can assign new firmware images to Customers or globally distribute to all customers.

Firmware Downloader: Every time a Base Station synchronizes data with the Cloud server 104, it checks if new firmware images have been published. If a new image is available, the Base Station downloads it.

The cloud server 104 includes an email notifications component that is used to send email notifications at any time various events are detected. It also emails periodic reports. To guarantee operation with the widest variety of email clients, from desktop PCs to mobile phones, the email messages will be simple, text-only messages. Alternate embodiments would include a component to send other types of messages, such as SMS "text" messages, when desired by the customer or administrator Event Alert Notification: When a Liquid dispenser station reports a serious event, the cloud server 104 immediately sends an email message to both the supplier and the customer. In case the event is reported multiple times, there will be a hold-off period that begins after sending the first email. The hold-off period must expire before sending a second email or any subsequent emails. This prevents the cloud server 104 from sending too many email messages to a customer. Alternate embodiments would include a component to send other types of messages, such as SMS "text" messages, when desired by the customer or supplier.

Filter Expiry Notification: When a Liquid dispenser station reports a filter that is soon to expire, the cloud server 104 sends an email message to the customer, supplying details about the station location, including traffic data, age of the filter, etc.

Monthly Filter Notifications for Customers: Once each month, the cloud server 104 emails a report to each customer. The report includes usage information for liquid dispenser stations, along with the status of each filter. It also predicts the date that each filter will expire. This service is directed to customers who have not subscribed to the filter replacement program.

Cloud Server Database Summary

In an exemplary embodiment, the cloud server 104 maintains a database comprising a set of tables. These tables, the record types and their interrelations, are described below.

User Tables: The User tables identify user logins for authentication and access control. The username is an email address, and the password is stored as a one-way hash. Users are either: stations, customers or staff. Customers can be assigned a category, such as: Elementary School, High School, University, Office, Health Club, etc. A switch on the Staff table grants administrative privileges. Multiple contacts can be entered for each user, in the form of addresses, phone numbers and email addresses. Contact types can be: personal, work, home, etc.

Base station tables: A base station is a type of User, and can log in to access web services.

Media Schedule Tables: A Media Schedule indicates that a media file should be published to a Liquid dispenser station and displayed for a period of time. Media Schedules can be unique to each Liquid dispenser station. The start and end dates are optional. Customers can create media schedules for only their own equipment, but Staff can create media schedules that apply to all Customers, or a subset of Customers.

Liquid dispenser station and Filter Tables: Liquid dispenser stations are owned by Customers. There are hourly and daily records covering the operating lifetime of Liquid dispenser stations and filters.

Application Log Tables: Critical actions by users of an application are captured in log entries in the Application Log Tables.

Regarding the cloud server 104, additional functionality provided in various enhancements to the previously described core functionality of an exemplary embodiment is summarized below.

Media Email Reminder: The cloud server 104 sends an email to a customer whenever the current set of media files was about to expire. Alternative embodiments would include a component to send other types of messages, such as SMS "text" messages, when desired by the customer or administrator.

Advanced Ad Tracking: For media files that are actually paid advertisements, the LDS counts the times an advertisement was playing while water was being dispensed.

Advertising Director: A new type of user on the system is created to allow uploading and scheduling of paid advertising for customer's dispenser stations 106. This user might not be an employee, and may have full administrator privileges or a subset required to manage necessary advertising needs.

Quick Media File Creator: A customer or administrator selects from a list of stock layouts and backgrounds and then uses a page editor to create a text message. The output of the page is a media file for display on the dispenser stations 106.

Tech Support Live Online Chat: A customer uses this live online chat feature to ask for help from tech support.

Track Consumer Usage: Consumers swipe an RFID tag or personalized bottle to enable the bottle filler. This usage could be tracked on the server.

Database Roll-up or Purge: Administrators may either roll-up or purge records from the database.

Dispenser Station Node (Liquid Dispenser Station 106):

Central to the networked system depicted in FIG. 1 is a liquid dispenser station node (e.g. a bottle filling station with one or more bubblers) such as the liquid dispenser station 106(1). The liquid dispenser station node includes a programmed controller having a variety of electronic sensors and a communications interfaces for exchanging (sending/receiving) a variety of operational and configuration data with a cloud server 104 (via an intermediate networked base station such as the base station 102).

Figure 2:
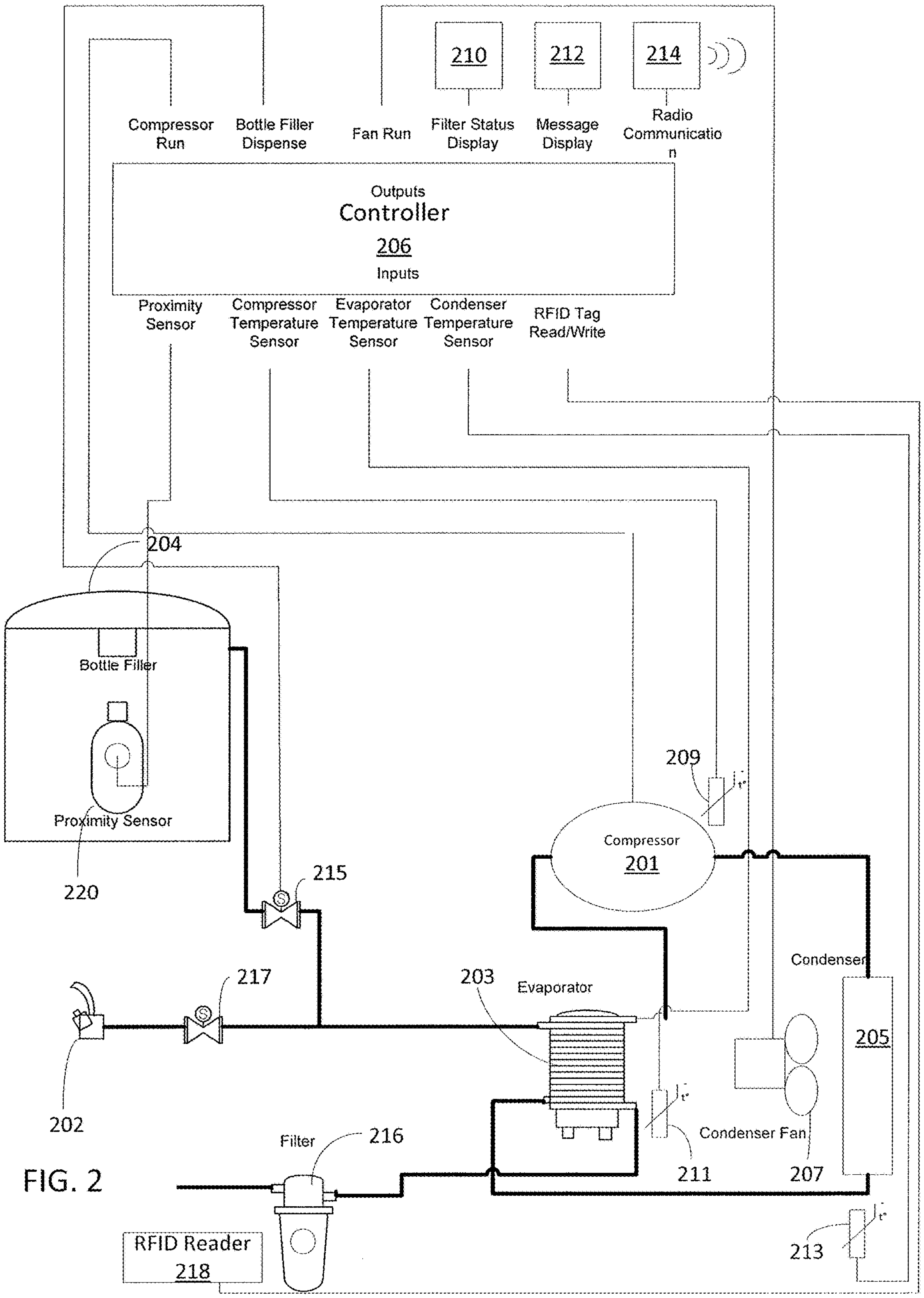
FIG. 2 is a schematic drawing of an exemplary hardware architecture of the liquid dispenser station of FIG. 1.

Turning to FIG. 2, a schematic drawing is provided of an exemplary liquid dispenser station (LDS) that dispenses water through a bubbler 202 (with a manually actuated mechanical valve 217) and a bottle filler 204 (with an electronically actuated valve 215 under control of a signal provided by a programmed controller 206 including a programmed processor configured with a computer-readable medium including computer-executable instructions for carrying out the functionality described herein). The LDS includes standard liquid cooling hardware such as: a compressor 201, an evaporator 203, a condenser 205, and a condenser fan 207. A set of temperature sensors 209, 211, and 213 are provided to monitor the operating temperature of the compressor 201, the evaporator 203 (including a cooled liquid reservoir) and the condenser 205. Each of the temperature sensors 209, 211, and 213 provide corresponding signals that are received by a set of corresponding inputs of the controller 206. Operation of the compressor 201 is controlled by a signal provided by the controller 206 to a power relay or by directly switched supply power by the controller 206 based upon the input sensor signals indicating whether cooling of the liquid is desired as well as the other temperature sensors values indicating the operational health of the LDS cooling system components.

Similarly, the controller 206 is configured with an output interface providing similarly switched power for controlling the condenser fan 203 based upon a temperature signal provided by the sensor 213.

The controller 206 of the LDS tracks usage of the bubble 202 and the filler 204, and reports usage and events via a wireless communication connection between the radio communication interface 214 and a corresponding radio interface of the base station 102. The LDS includes, by way of example, a filter status display 210 including green, yellow and red colored LEDs which indicate filter health. An alphanumeric message display 212 displays a "Green Ticker" indicating how many times the traditional disposal of a plastic bottle was averted.

With an optional graphic display (not shown), a composite graphical representation of the Green Ticker and visual indications of filter usage and other information are displayed. The graphical display plays full motion video content. The graphical display is an add-on to a base version of the LDS depicted in FIG. 2. The graphical display system includes a color screen capable of playing full-motion video, as well as provisions for attaching external viewing devices (e.g. HDMI compatible display screens and audio equipment). The graphical display system has its own long-term memory to hold media files, and video file processing hardware to decode and play video files. The graphical display system uses the communication built-in to the LDS to download media files from the cloud server 104 via the base station 102.

A water filter 216 is provided with a radio frequency identification (RFID) sticker affixed to the side that serves/facilitates a number of functions and purposes. The RFID stickers indicate the filter model, manufacturing date, etc., and uniquely identify each filter with a serial number. The LDS includes an RFID reader 218 including a Near-Field Communication (NFC) sensor to read the data stored on the sticker. The RFID reader 218 includes a signal line for communication with the controller 206. The filter 216 can expire due to usage (volume) or passage of time. A water filter is generally deemed to expire after a calibrated/designated volume of water has passed through it. The LDS also uses the RFID reader 218 to increment a counter embedded in the RFID sticker affixed to the filter 216 for every gallon of water that passes through the filter 216. An expired filter, therefore, can be reliably and consistently identified, even if the filter is removed and installed in another LDS. In an exemplary embodiment, the filter status LED of the filter status display 210 is green, when an 80 percent of life threshold is reached, the controller 206 causes the yellow LED to illuminate, and the red LED is illuminated when the filter 216 has processed more than 100% of its capacity.

With regard to expiration due to the passage of time, as soon as a filter is opened, the activated carbon of the exemplary filter begins to immediately become consumed. For this reason, even filters such as this that see low usage rates are "expired" after one year from the date they were first installed in the LDS. The controller 206 causes the filter status display 210 to illuminate the yellow LED when a month of life remains, and causes illumination of the red LED after the entire lifetime is expired. The controller 206 is configured with a computer-readable medium including computer-executable instructions for carrying out the functionality summarized below.

Before listing the incorporated/programmed/configured functionality of the LDS under control of the programmed processor, it is importantly noted that the LDS includes an infrared (PIR) sensor assembly 220 to provide the controller 206 with a sensor signal intensity value for detecting, through variations in the IR sensor signal intensity via the "proximity sensor" signal interface of the controller 206, an object (e.g. bottle) positioned under an outlet of the filler 204 outlet. Based upon an infrared sensor assembly signal processing schemes described herein below with reference to FIGS. 5 and 6A-G, the controller 206 issues an electronic dispenser valve control signal to open/close the dispenser valve 215.

In such environment, the programmed controller 206 is configured to carry out the following enumerated functions:

1. Count bottles by flow time
2. Keep error log
3. Retain configuration and usage data across power failures
4. Auto adjustable timed shut off for bottle filler
5. IR sensitivity feature
6. Compressor control
7. Write to filter at prescribed intervals
8. Control LED Filter status (some models)
9. Play full-screen video on optional Graphic Display
10. Scroll messages (error, etc.) on either Alphanumeric Display or Graphic Display
11. Poll evaporator temp every x seconds (configurable.)
12. Report coldest evaporator temp over last 24 hrs
13. Monitor and log the following "events" per hour: Gallons dispensed, Bottles filled, Bubbler usage
14. Record compressor run time at various frequencies (e.g. per hour, per day, etc.)
15. Retain water temp set point(s)
16. Manage/Process Watchdog timers (display, controls, brownouts, etc.)
17. Store serial number(s) or unique IDs (BF and Cooler)
18. Record compressor temp and/or return gas temp
19. Operational Configuration Modes: (e.g. filtered, non-filtered, refrigerated, non-refrigerated, etc.)
20. Sense RFID chip sensor assembly to determine whether a filter is present and to control read/write events
21. Self-learning for energy savings
22. IR sensor triggers bottle fills after intelligent and self-adapting delay
23. For IR sensor triggered bottle fills, shut water off as soon as bottle is removed via advanced detection algorithms
24. Keep filter status history, record consumption as it is used
25. Calculate volume based on time for bottle fills and bubblers
26. Monitor Bubbler(s)
27. At start up, test analog inputs and outputs for proper resistance values, etc. to verify initial system health
28. At start up, check for communication with local radio network.
29. Only communicate with Base Stations or peers owned by same customer.
30. Coordinate channels in band between base stations owned by other customers for intelligent frequency hopping
31. At start up, and after power outage, display version number
32. While running, maintain local radio network connection and renegotiate as needed.
33. Store ID of Base Station it is associated with
34. Connected unit sends periodic report to base station, including usage, other status, etc.
35. Connected unit receives updates periodically, such as new media schedule, media files, configuration, etc.
36. LED display control for filter life: For new filters issue light green LED illumination; when filter use exceeds the warning threshold (e.g. 80% utilized) illuminate yellow LED; and when filter use exceeds filter capacity (100% utilized), illuminate red LED and scroll message on Alphanumeric Display, or indicate on Graphical Display.
37. Display filter usage on Graphic Display via bar chart/graph.
38. When filter use exceeds filter capacity, update display and display alert
39. When filter is removed or missing, display indicates deficiency (e.g. "NO FILTER")
40. When filter is replaced, update records to current filter ID, capacity, and usage. Also, update displays and retain old filter data retained for transmission on next data transfer.
41. Continuous periodic self-check evaluates sensors, etc.
42. Controls illumination of alcove area during stand-by (dimmed) and active (bright) modes.
43. In energy saving mode (compressor disabled), water still available, display and alcove illumination activates on request for water
44. Back-up and restore option thru MMI on board or remotely via radio for board replacement
45. Multiple bottle filling dispensing options supported: cold, ambient, hot
46. Pay-per-user add-on peripheral: magnetic strip, cash/coin, smartcard, etc.
47. RFID reader for personal identification by: key fob, NFC sticker on bottle, etc. (for payment and tracking)
48. Audio output for discrete audio equipment
49. Graphic displays play media files according to the media schedule
50. Newly commissioned units auto-connect to local radio network with minimal configuration The following summarizes in further detail an exemplary architecture of the controller 206 for the LSD depicted, by way of example, in FIG. 2.

Figure 3:
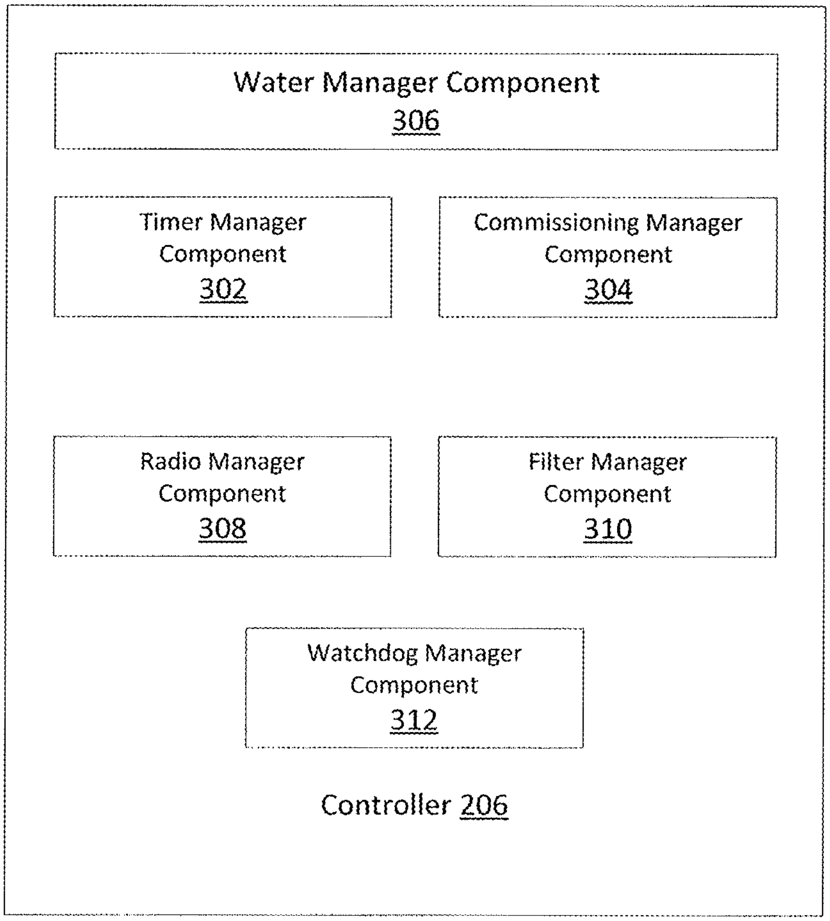
FIG. 3 is a schematic drawing summarizing a set of programmed processor components incorporated into the controller of the liquid dispenser station of FIG. 2.

Turning to FIG. 3, the controller 206 of the liquid dispenser station is configured with multiple programmed components/modules in the form of computer-executable instructions stored on a non-transitory computer-readable medium. The programmed components/modules comprise configuration data and instructions executed by the controller 206 that are separated into distinct high-level executable components. In an exemplary embodiment, each programmed module/component is executed by the controller 206 in a distinct and separate thread under, for example, an MQX Real-Time Kernel. The thread model allows for a separation of high-level functionality and for more easily maintained event-driven executable modules. This includes well defined thread interfacing such as with messaging, mutexes and thread synchronization. It also allows for effective processor usage with threads working while other threads are blocking/waiting for triggering events to occur before becoming active.

The programmed modules/components configure the controller 206 to: provide a wireless bridge to the base station 102 for file (request and retrieval) and configuration; and control and monitor all LDS activities including: water filling, water selection, system error handling, energy management, filter management, LDS configuration, and ensure/monitor system reliability. By way of example, the controller 206 is configured to execute a system initialization thread that performs global resource initialization and then sets up other executable threads to start executing. There is also interrupt service routine handling as needed, such as for communications and external input signal monitoring. The primary functional tasks of the controller 206 are organized, by way of example, as state machines in threads. There is interaction between the threads such as providing data from the Radio Manager to the Display Board Manager. After booting up and initializing all system peripherals, drivers, state machines, data configurations and tables, the Control Board executes the application software modules to monitor and control the LDS activities such as: water management and flow control, filter detection and management, commissioning, radio communications with the base station 102, and controlling operation of the display interface (including graphical/video output).

Having generally described the functionality of the programmed components of the controller 206, attention is now directed to the particular programmed components with reference to FIG. 3. In that regard, the controller 206 on the LDS includes programmed components for: carrying out startup initialization, device drivers and multiple functional threads. The controller 206 includes threads for: water management, radio communications, commissioning, managing a display, managing a filter, managing watchdog times and carrying out debug/diagnostic operations. These threads, in an exemplary embodiment, are distinct executable components of the controller 206 that have internal states with state transitions triggered by internal or external events. Other components or libraries include various drivers of the signal interfaces of the controller 206 and associated hardware.

The controller 206, in operation, includes a timer manager component 302 that provides timers facilitating tracking multiple time spans utilized by the LDS. In an exemplary embodiment, the controller 206 utilizes two main timers. A first timer is a real time clock (RTC) which is primarily used in reporting and scheduling functions carried out by the controller 26. A second time is an internal timer. Both timers operate essentially the same. However, the second (internal) timer is used primarily to measure delta times and has a granularity of milliseconds. The first (RTC) timer provides date and time values stored as Coordinated Universal Time (UTC) format. All times exchanged between the base station 102 and the LDS are in UTC format. The times provided by the timers managed by the timer management component 302 are used, by way of example, for the following purposes:

1. Energy management (to turn off cooler components during periods of the day when the LDS is not used); time stamp for server reports;
2. Media presentation scheduling (e.g., programming videos rendered on the graphical display of the LDS);
3. Providing a low-level millisecond timer (a relatively high resolution relative time value) for liquid flow measurement, sensing control, refrigeration control, etc.
4. Controlling compressor on-time since over-temperature (to decide when the condenser fan is incapable of maintaining an over-heating compressor below a desired temperature limit);
5. Tracking and responding to external (e.g. bubbler) switch pressing event/duration,
6. Periodically triggering temperature measuring events;
7. Process polling timing (i.e. scheduling), etc.

RTC timer synchronization occurs through base station status messages that contain the date and time. Every time the controller 206 receives a base station status message with a non-zero time field where the provided time does not match with the internal RTC time, the controller 206 resets the first (RTC) timer. Note that RTC timer resetting will affect the second (low-level millisecond) timer for relative (delta calculation) timing. Also, the first (RTC) time is protected for short power outages.

The RTC timer is also settable through a local human interface, such as a button/menu interface, in potentially less granular resolution.

The controller 206, in operation, includes a commissioning thread 304. Commissioning of the LDS can occur from either one, or a combination of, commissioning/configuration data received via: a local interface such as a USB port connected to a commissioning personal computer, and a radio communication interface providing such information (from the cloud server 104) in messages issued by the base station 106 to the LDS (e.g. local dispenser station 106(1)); and a one switch selector (to set IR Range(s), Refrigeration, filter capacity and reset bottle count). Exemplary configuration data Exemplary Configuration data includes:

IR Range (1-10) for each bottle detector,

IR LED current setting (0-20),

Evaporator low temperature threshold for alarms,

Compressor high temperature threshold(s) for alarms (e.g., initial warning and critical levels), Refrigeration/Non-refrigeration (for control of task scheduling/enabling), Flow rates for bottle fillers: e.g. low (1 gallon/min default) and high (1.5 gallon/minute default), Flow rate for Bubbler (0.5 gallon/minute default), Filter capacity (gallons), Bottle count (Green Ticker) preload (or reset with a preload of 0), Units of measure for display (e.g. metric or Imperial), Maximum flow time for bottle fillers (20 s default), Unit name, Serial Number, Filter expiry rules (80% enables caution, 100% enables warning), Time/Day of Week (for the RTC if a configured base station is not available), Files (i.e. video/audio, schedule, configuration), Radio-specific Commissioning data: Network Join ID for Radio and Device ID Status/Telemetry data includes: error conditions, filter status (detection, serial number, percent usage, hours used), Date/Time (UTC format for internal storage and M2M communications. For human-readable displays, it is converted to local time.), temperatures and temperature out of range (maintained to 1 decimal place, in Fahrenheit or Celsius), type of display (Graphic, Alphanumeric, none), water usage per hour (over n days), number of drinks from bubbler(s), water usage for life of LDS (although it can be preloaded with a value including 0), bottle count (Green Ticker is based on 20 oz. bottles and is derived from this value), and radio RSSI and Link Quality (for radio interface commissioning).

Figure 4:
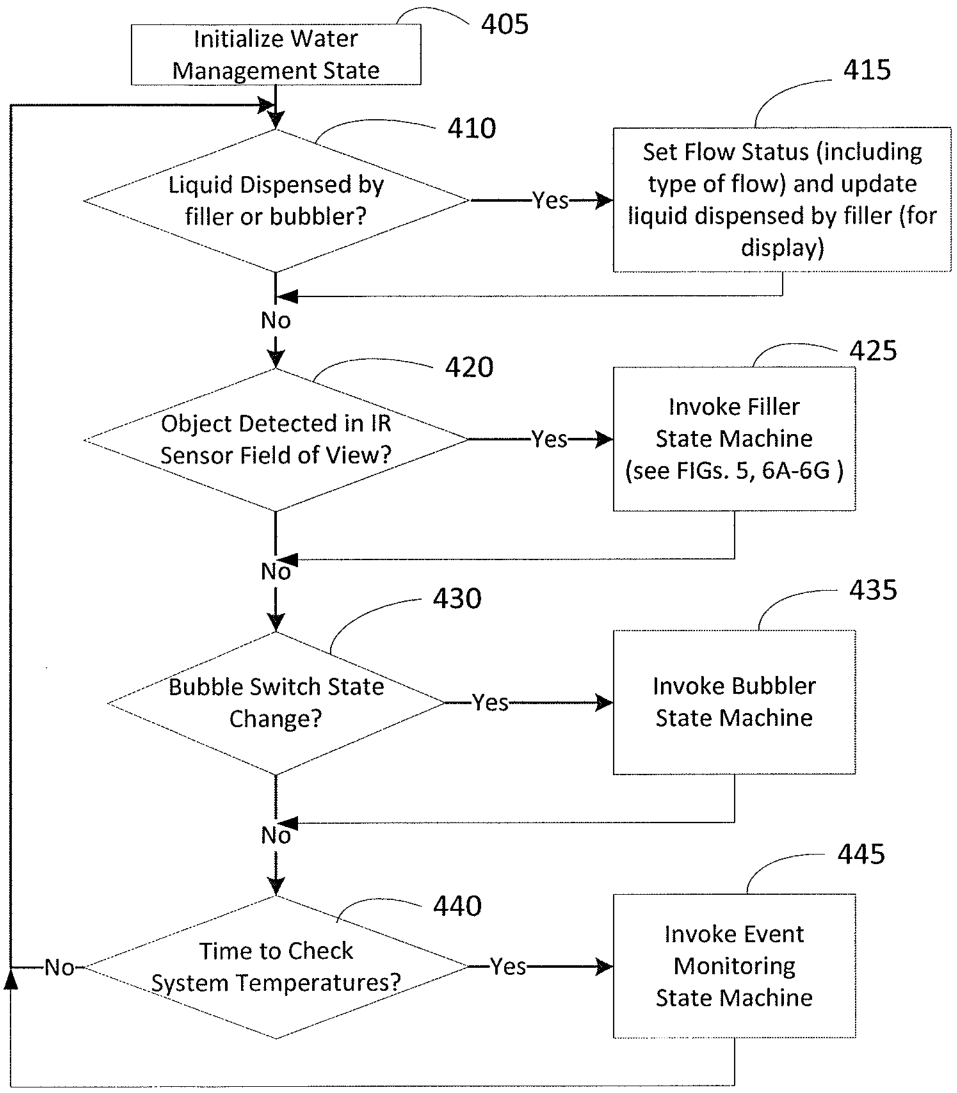
FIG. 4 is a flowchart summarizing operation of an exemplary water manager component.

A water manager component 306, described herein below with reference to FIG. 4, is implemented on the controller 206 as a water management state machine. The water manager component 306 is, in operation of the controller 206, a master module in the LDS. The water manager component 306: monitors and controls flow of liquid (water) through outlets of the filler 204 and the bubbler 202, informs other components (e.g., Filter Manager and Display) of LDS usage status, and handling high-level communications via the Radio Manager component 308. The water manager component 306 consolidates data relating to commissioning the LDS. The high-level Water Management state machine is described below with reference to FIGS. 4, 5, and 6A-6G.

In general, the water manager component 206 provides the following data to other components of the controller 206: water usage delta (since last report), water flow status (Bubbler and/or Bottle, on or off); temperatures and temperature errors, error conditions such as water shut off, Filler tamper detect, etc.; water usage statistics (Fills, Bubbler drinks, etc.); and leak detection notifications. The water manager component 206 uses the following data elements from other components: calibration settings such as flow/second for hot and cold, hot water available setting, water temperature set points, and water filter status. Other provided and received information types are contemplated as the above-mentioned examples are intended to be exemplary in nature.

Turning to FIG. 4 a flowchart summarizes high level operation of the water manager component 306, which is implemented in the illustrative example in the form of a set of function-specific state machines invoked by a main processing loop (depicted in FIG. 4) of the water manager component 306. Initially, at 405, the water manager component 306 initializes the water management/control state of the LDS. By way of example control and status parameter values are reset, including: all timers (e.g., flow, periodic sensor reading, wait periods, etc.), all events, sensor signals, flow/valve controls (valves turned off) for bubbler(s) and filler, liquid cooling system set to default on state, etc. Control then passes to 410.

During 410, if liquid flow has been detected (by either the filler or bubbler) by a switch activation signal associated with a liquid flow control valve (for either the filler or bubbler), then control passes to 415 wherein appropriate usage parameters are updated (gallons consumed—for filter management, plastic bottles saved—for green ticker, etc.). Control then passes to 420. If no flow has occurred, then control passes directly from 410 to 420.

During 420, the water management component 306 determines whether the IR sensor assembly 220 has provided a signal value to the controller 206 indicative of an object within the field of view. Object (e.g. bottle) detection is performed with one or more IR detectors that provide a representative sensor signal to the proximity sensor signal input interface of the controller 206. In an illustrative example, the LDS provides a mechanically actuated switch that a user can press to activate the filler if the IR detector is unable to detect the bottle when placed under the filler or in situations where IR sensors may not be advisable (e.g. vandal resistant or outdoor models). After the object is detected and the filler is activated, an override timer (set to 20 seconds for example) will stop flow through the filler even if an object is still in the sensor's field of view. After the override timer is exceeded, the filler will not be re-activated until the filler switch is depressed or the IR sensor detects removal of the object from the sensor field of view and an object is placed in the target area.

If an object is detected during 420, then control passes to 425 wherein a filler state machine is invoked. The operation of the filler state machine is described herein below with reference to FIGS. 5 and 6A-6G. After invoking operation of the filler state machine, control then passes to 430. If the sensor signal does not indicate an object within the field of view of the IR sensor assembly 220, then control passes directly from 420 to 430.

During 430, the water management component 306 determines whether the switch, for activating/deactivating the valve for the bubbler, has changed state (either on or off switch position) to commence/stop liquid flow through the bubbler. If the bubble switch state has indeed changed, then control flows to 435 wherein a bubbler state machine is invoked. By way of example, bubbler switches are connected to general purpose inputs of the controller 206 that are configured as edge-triggered interrupts. This is due to the water flow commencing immediately in response to actuation of a bubbler switch (no wait period). Therefore, the time that water is flowing has to be accurately measured. The controller 206 immediately sets an interrupt flag corresponding to actuation of the bubbler switch and resets and starts a timer (read from the RTC timer managed by the timer manager 302) for determining a total flow of liquid during the bubbler actuation event. The water manager component 306 monitors the flag and time counts to monitor/determine the bubbler flow status and the total volume of water during the bubbler active state. The liquid flow information is recorded and used to update a total flow for use by the filter manager and the output display (if total gallons dispensed are displayed) to record water usage when a subsequent state change of the bubbler switch indicates that flow should end. The flow information is also provided for statistical use by configuration and telemetry components of the controller. After invoking the bubbler state machine, control passes to 440. If the bubbler switch state has not changed, then control passes directly from 430 to 440.

During 440, the water manager component 306 polls a set of timers associated with the various temperature sensors discussed above with reference to FIG. 2. As noted above, the temperature monitoring points include the condenser 205, evaporator 203 and compressor 201 housing. In the case of the evaporator 203 temperature reading, an asynchronous warning notification is sent to the cloud server 204 in the event that the temperature readings remain below a configured minimum (such as −4 degrees C.) value for period of time exceeding a specified duration (for instance 3 minutes). In the case of the compressor 201 temperature reading, an asynchronous warning notification is sent to the cloud server 104 in the event that the temperature readings remain above a configured maximum (for example 50 degrees C.) value for a period of time exceeding a specified duration (such as 3 minutes). In this exemplary case, two levels of compressor temperature warnings are possible: one that indicates a lower temperature threshold has been crossed (which may indicate that non-critical maintenance is required) and one that indicates an upper threshold has been exceeded (which could be potentially critical). When the upper limit has been exceeded, a refrigeration system shut down occurs that requires a manual reset before operation resumes. In the case of the condenser 205 there is also a temperature threshold set that, when exceeded, results in a non-critical warning being displayed and sent to the databases (local and cloud, if connected). The condenser 205 also has a fan 207 to help cool it that is turned on at a settable temperature below this maximum temperature and turned off a few degrees below this setting to allow for hysteresis. A startup period of time to allow temperature normalization to occur takes place before any out of range notifications are sent.

Additionally, the temperature readings are used by the controller 206 to manage (reduce/minimize) energy consumption by the LDS. Under normal operating conditions, on refrigerated models, the cold liquid reservoir temperature (evaporator 203 temperature) is monitored to turn the compressor 201 on or off when further cooling is not needed. In addition to shutting down the compressor 201 when the liquid has reached a low temperature boundary for normal use, advanced control schemes can utilize usage patterns (i.e. absence of uses for extended periods of time) to turn off the cooling function when usage is not likely. This can be determined by usage statistics or via a schedule from the Base Station.

With continued reference to 440, if any of the prescribed wait periods for polling a temperature value have expired, then control passes to 445 where a temperature monitoring event state machine 445 is invoked to handle the new temperature event. In general, the event monitoring state machine, once invoked, compares a current temperature value to an appropriate threshold. If a threshold has been reached/passed, the state machine triggers additional alerts and events for further processing by the controller 206 to take remedial actions relating to the detected temperature event. Examples of responsive actions when a temperature event occurs (for any sensed temperature—including ones within an acceptable operating range) include: recording the sensed temperature, generating a notification for transmission to the cloud server 104 (for further notification processing), invoking a control loop routine (e.g. to stop the compressor when the reservoir contents are sufficiently cool, start a cooling fan, etc.), derating operation of the cooling system of the LDS, etc. After invoking the temperature event monitoring state machine, control passes from 445 back to 410 (after a configured wait). Alternatively, if none of the prescribed wait periods for polling a temperature value have expired, then control passes back to 410 (after a configured wait).

Returning to FIG. 3, a radio manager component 308 is configured for detecting a local wireless network (e.g. the base station 102), connecting to the base station 102, sending data to the base station 102 and listening to broadcast messages (file chunks, Base Station Status and Connection Acknowledgements) from the base station 102. The radio manager component 308 also uses the wireless connection to the base station 102 to send status, statistics and file chunk requests to the base station 102.

By way of example, radio manager component 308 of the LDS (e.g. liquid dispenser station 106(1)) performs the following functions:

- Joining a network that the base station 102 maintains (and rejoining if the network goes down due to a reset, a firmware update or other reason);
- Sending messages to the base station 102 (connection request, status/statistics, file chunk requests);
- Receiving messages from the base station 102 (connection ACK, status, file chunks); and
- Assisting during commissioning such as radio configuration and radio status (RSSI and LQI).

By way of example, the radio manager component 308 exhibits the following behaviors with regard to providing data from the LDS to the base station 102:

- status/water usage/file chunk requests are sent to the Base Station once per hour (with an initial offset of a random 0 to 2 minutes);
- file chunks may or may not be received over the next hour. After the next 60 to 62 minutes, the LDS consolidates a list of needed file chunks, and then submits the request list. Thereafter, received file chunks are removed from the list for the next request time. Also, if file chunks are being broadcast from the base station 102, this will delay the LDS asking for the next set of file chunks to avoid network collisions. Since most media files will be common on all of the LDS units **106(1-*n*) within the local network of the base station 102, each one of the LDSs 106(1-*n*)** may request the same file chunks. To improve the amount of unique file chunk requests, in an alternative embodiment, the LDS units add some randomization information for the file chunks requested at a given time.
- LDS status information, including usage reports, typically contain one hour of statistics data. If it has been longer than two hours since the report has been sent due to the base station 102 sending file chunks, the report will include two hours' worth of statistics data, and so on. These status and statistics reports (messages) are ACKed by the base station 102 with the base station 102's status message. If the ACK is not received, the status/statistics data will be sent one hour later with an extra hour worth of status up to a maximum. Also, the hourly data is stored in relation to absolute clock hours, i.e. resetting at 0 minutes after the hour for the next set of data.

The wireless communication radio interface configuration is partially performed during factory configuration. Factory calibration includes setting a security key (which is hard-coded) and a local network Join ID (which is programmable). The Join ID is to remain constant for all networks. The controller 206 serial number, which is used for local network authentication, is calculated from a 128 bit Unique ID on the local processor. Transmit power levels are configurable during commissioning.

With continued reference to FIG. 3, a filter manager component 310 is configured for detecting and managing the LDS water filter 216 and determining its status. This includes detection of presence, obtaining a serial number, monitoring the amount water flow through the filter, and status LED control for the filter status display 210. The LED control can be indirectly overridden by another component using messaging. Data provided to the filter manager component 310 includes: add to water usage count, add to time usage count, override LED status with LED values, and cancel override LED status. Data provided by the filter manager component 310 includes: filter present status (not present, error, new, usage good, usage warn, usage expired warn, usage expired), filter model number, filter serial number, filter capacity, filter flow amount/percentage of lifetime used, filter time amount/percentage used (based upon for example a 12 month lifetime).

Figure 7:
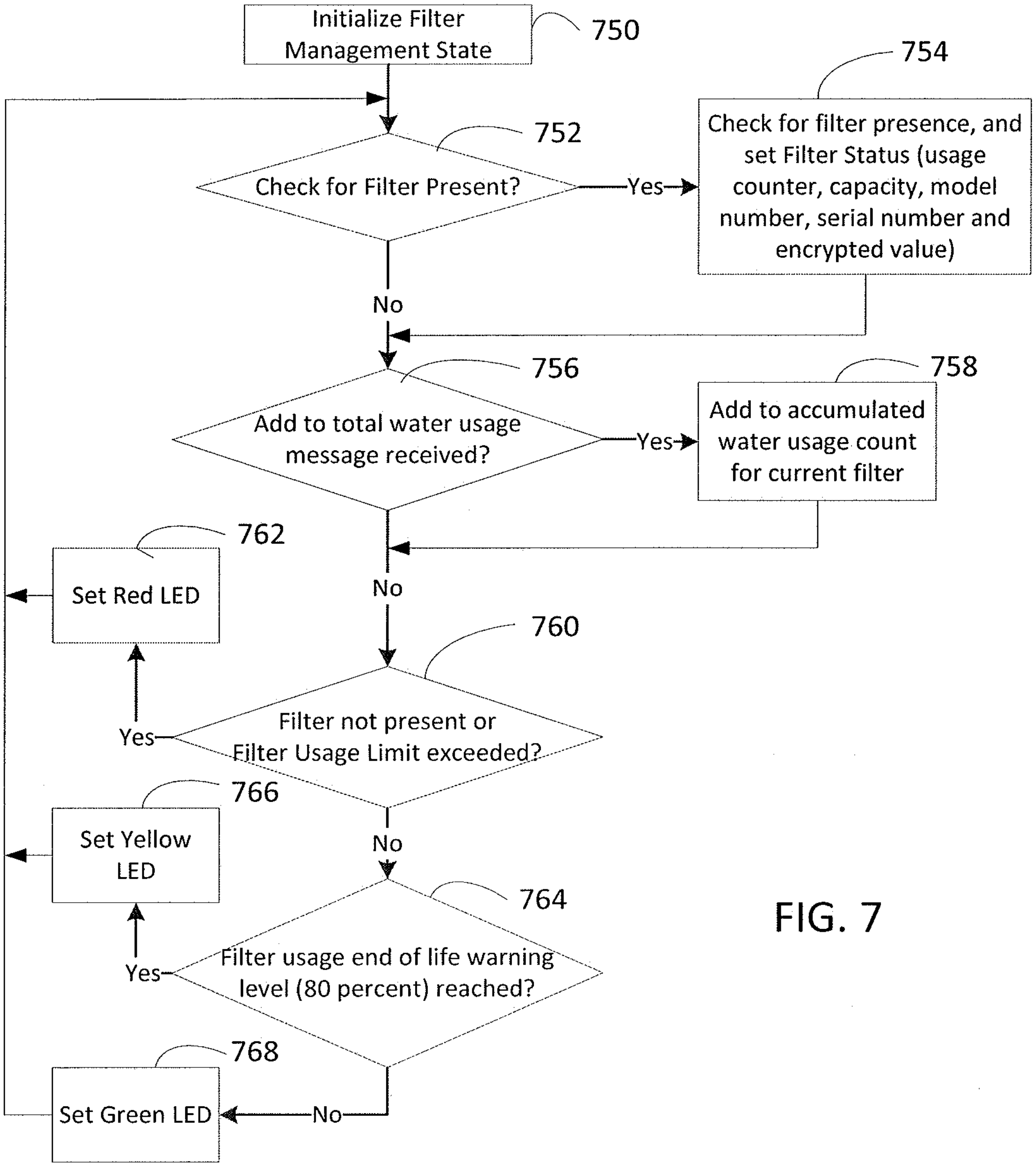
FIG. 7 is a flowchart summarizing operation of an exemplary filter manager component.

Turning to FIG. 7, an exemplary flow of operations for the filter manager component 310 is summarized. During 750 the filter manager component 310 initializes filter management state variables. Thereafter, control passes to step 752. During 752 the filter manager component 310 determines whether a "check for filter" flag is set—indicating that the current status of the filter presence is unknown. If the "filter presence" status needs to be determined, then control passes to 754. During 754, the filter manager component 310 polls an electronic signal interface indicative of the filter presence and sets the filter status as either "present" or "not present". Additionally, if the filter is present, then the filter manager component 310 additionally determines and records information relating to the filter including: usage count, capacity, model number, serial number, and an encrypted value (prevent tampering with counter value or other identifying information on the filter). Control then passes to 756. If the filter presence status is already known, then control passes directly from 752 to 756.

During 756 the filter manager component 310 determines whether an "add to total usage message" notification is pending (for processing by the filter manager component 310). If one or more "add to total usage message" notifications are present, then control passes to 758 wherein the additional usage specified in the one or more pending messages is added to an accumulated usage total for the current filter. Control then passes to 760. If no new usage message notifications are pending, then control passes from 756 to 760.

The remaining portion of the filter manager component 310 is dedicated to determining which one of a set of LEDs (red, yellow, green) should be illuminated on the filter status display 210 based upon the previously obtained usage capacity/lifetime limits and currently determined usage volume/time values. During 760, if the filter is either not installed or the filter usage limit (either total volume or total time of use) is exceeded, then control passes to 762 wherein the red LED is set for illumination on the filter status display 210 (the yellow and green will be reset if necessary). Appropriate filter status flags are set that are subsequently processed by handlers to generate and provide an alert within a status/alert message passed by the LDS to the cloud server 104 (via the base station 102). Control then passes to 752 (after an interruptible sleep/wait period). If the filter is present and usage limits are not exceeded, then control passes to 764.

During 764, if the filter usage (either volume or time duration) has reached an end of life warning level (e.g. 80 percent of volume capacity or lifetime), then control passes to 766 wherein the yellow LED is set for illumination on the filter status display 210 (the red and green will be reset if necessary). Appropriate filter status flags are set that are subsequently processed by handlers to generate and provide an alert within a status/alert message passed by the LDS to the cloud server 104 (via the base station 102). Control then passes to 752 (after an interruptible sleep/wait period). If the filter usage has not reached the end of life warning level, then control passes to 768. During 768 the green LED is set for illumination on the filer status display 210 (the red and yellow will be reset if necessary). Control then passes to 752 (after an interruptible sleep/wait period).

With continued reference to FIG. 3, a watchdog manager component 312 monitors a set of "check-in" flags that are set on a configurable basis by the various components of the controller 206 described herein. After the components have registered with the watchdog to create a check-in flag and associated check-in period, the watchdog manager component 312 reads the flag to ensure the flag was set within the configured watchdog timer cycle. If the flag was set, then the watchdog manager component 312 resets the flag and the period timer for that particular check-in flag. If the registered component does not reset the flag within the configured check-in period, then the watchdog manager component 312 issues debug information to a debug shell and resets the check-in flag after registering the check-in failure for the component. For each registered component, the watchdog manager component 312 includes, by way of example, the following information fields:

- Component ID (enum)
- Component name (for debug shell purposes)
- Maximum number of ticks allowed between check-ins with the Watchdog component
- Boolean to determine if this component can cause a reset if it misses its maximum delta check-in ticks
- The current delta ticks since the last check-in
- The high threshold of delta ticks counts (for debug shell purposes and fine tuning)

Turning to FIG. 5 and FIGS. 6A-G, an exemplary set of operations are described for controlling the flow of liquid through a dispensing device in accordance with the operation of liquid flow control logic incorporating a set of four operational states. First, a set of four states of the liquid flow control logic are described. Second, a set of exemplary parameters and associated purposes are described with reference to FIG. 5. Third, exemplary control logic for an infrared sensor-based liquid dispensing station is described with reference to FIGS. 6A-G.

In an illustrative example, the liquid flow control logic (after initialization) operates in one of the set of operational states consisting of: Off, On, Waiting to Clear (the IR sensor field of view), and Error.

The Off state is characterized by an absence of liquid flow. The liquid flow control logic is waiting for an object to be placed in the detection field of the proximity (e.g., infrared "IR") sensor assembly for a sufficient period of time before transitioning to the "On" state. It is noted that the "Off" to "On" state transition does not occur until the object (e.g. bottle) in front of the sensor assembly is sufficiently still (if moving, then moving only slightly) for a wait period.

The "On" state is characterized by the presence of liquid flowing. During the "On" state the liquid flow control logic is waiting for the occurrence of one of multiple events that will cause cessation of fluid flow and transition of the logic from the "On" to the "Waiting to Clear" state. Such transition occurs when one of the following occurs: a maximum flow time period expires, the sensor field is empty, or the object in the field is not sufficiently stationary (violating a substantial stillness requirement).

The "Waiting to Clear" state is characterized by an absence of fluid flow and continued monitoring of the IR sensor field while waiting for an object to leave the IR sensor field. The liquid flow control logic transitions from the "Waiting to Clear" to the "Off" state if the object leaves the sensor field within a prescribed time period. Otherwise, the logic transitions from the "Waiting to Clear" to the "Error" state (i.e., the image sensor field is being temporarily/permanently blocked).

The Error state is characterized by an IR sensor continuously sensing an object within the sensor assembly field of view. Depending on the duration of the sensed error state, the liquid flow control logic transitions (initially) into a "soft error" sub-state where a local message is displayed. If an error condition is registered for a substantially longer time period than the one that initially caused a soft error, then the liquid flow control logic transitions from the "soft error" sub-state to the "hard error" sub-state. During the "hard error" sub-state, remedial operations may be taken to provide a maintenance notice to a networked server to render a notification prompting remedial maintenance action with regard to the identified error source and/or the error is logged in a database locally for future diagnostic reference.

Turning to FIG. 5, a set of exemplary parameters are identified that are utilized by an infrared sensor-based flow control operation in accordance with exemplary embodiments.

A bmaxflow parameter 502, also referred to as "Max Flow Time," specifies a configurable maximum time that a filling event continuously runs (i.e., the liquid is continuously on after sensing an object within the operation range of the infrared sensor). After a measured continuously on time exceeds the time duration corresponding to the Max Flow Time, the control logic for the liquid dispensing station registers a blocked sensor field error event and enters a "Waiting to Clear" state. Exemplary values for the bmaxflow parameter 502 value are from 5 to 30 seconds.

A botmovewin parameter 506 specifies a configurable distance measure (i.e. a "Bottle Move Window") within which a sensed object may move in the field of view of the infrared sensor of the liquid dispensing station without causing an event signaling the control logic to transition to a liquid flow "Off" state, thereby causing the liquid dispensing station to terminate a flow of liquid. The botmovewin parameter 506 is thus only relevant to control logic executed in association with the liquid flow "On" state of the system. The value for the botmovewin parameter 506 is calculated dynamically, in particular while in the liquid flow "On" state, based upon a product of a last IR measurement and a current value specified for an iroffdeltafrac parameter 520 (described herein below). Thus, the botmovewin parameter 506 specifies a tolerance around a last IR sensor-based distance measurement for a current distance measurement. Thus, an object (e.g. a bottle) will still be considered stationary, for purposes of continuing fluid flow while the system is in the liquid flow "On" state, as long as a calculated distance change value is less than the botmovewin parameter 506 value.

A hyster parameter 508, also referred to as "Low Hysteresis," specifies a configurable value specifying an amount of a hysteresis defining a "dead band" above an IR sensor signal intensity value for a irlthresh parameter 512 (described herein below). Properly tuning/specifying a value for the hyster parameter 508 avoids dithering around threshold values. In the illustrative example, the hyster parameter 508 is only used by liquid flow control logic associated with the liquid flow "Off" state and is used for specifying a signal value intensity triggering a transition from the liquid flow "Off" state to the "On" state, and only affects the trigger threshold for transition to the "On State". In an exemplary embodiment, a minimum intensity for transitioning from the "Off" state to the "On" state is calculated by the liquid flow control logic by adding the hyster parameter 508 value to a minimum threshold intensity value determined by adding the irlthresh parameter 512 value to a currently specified average "zero" level IR sensor signal intensity maintained by a minIR parameter 532.

An irhthresh parameter 510, also referred to as "IR High Threshold", specifies a configurable value for an IR sensor signal intensity measurement (i.e. one that is too high) that indicates an object (e.g. a bottle) may be too close to the sensor. The irhthresh parameter 510 is set to zero to disable the test in the liquid flow control logic for the object being too near the sensor assembly.

An irlthresh parameter 512, also referred to as "IR Low Threshold", specifies a signal intensity value applied by the liquid flow control logic to a floating "zero" level intensity value to render an IR sensor signal intensity value corresponding to an "empty field of view" for the IR sensor (i.e. no bottle/object present). The irlthresh parameter 512 value is used in conjunction with hyster parameter 508 and the minIR parameter 532 to trigger a transition from the liquid flow "Off" state to the liquid flow "On" state. The irlthresh parameter 512 is thus a useful parameter to adjust when the "On" logic is activated as an object is moved toward the IR sensor assembly to activate the liquid dispenser.

Similarly, the irlthresh parameter 512 may be used for calculations involving shutting off flow of liquid while the control logic is in the "On" state (i.e. liquid is flowing). When the dispenser is already on, the IR Low Threshold (added to the "zero" intensity level value) determines when the IR sensor field to be effectively empty, i.e. there is not a viable target in the field. The IR Low Threshold value may or may not be a determinant for when the dispenser shuts off. In one implementation, the liquid flow control logic transitions from an "On" to an "Off"" state based on a calculation of allowable change (delta) in IR sensor signal intensity that was detected when the logic transitioned from the "Off" to "On" state. In that case, an IR sensor signal intensity measurement may result in the control logic transitioning to the "Off" state while the measurement exceeds the intensity value determined by summing the Minimum Value and the IR Low Threshold.

In a case where both delta values and the aforementioned sum of the Minimum Value and IR Low Threshold are used to determine a transition to an "Off" state, it is conceivable that there could exist a combination of variables that would result in the IR Low Threshold determining the point at which the dispenser shuts off (the specified low delta, which is subtracted from the measured intensity when the logic transitioned to the "On" state, is very large).

Finally, regarding the irlthresh parameter 512, if the dispenser is in the "Waiting to Clear" state, meaning the dispenser is shut off but the sensor indicates the presence of an object in the field, the liquid flow control logic will not transition to the "Off" state until the measured IR sensor signal intensity value drops below either the sum of the Minimum Value (see irminavesamp 516 below) and the IR Low Threshold or the Minimum Value Wait (see minirclr 530 below) plus the IR Low Threshold.

An irled parameter 514 specifies a configurable value for controlling an intensity of the IR sensor's light emitting diode (LED). In an exemplary embodiment, distance is calculated as a function of sensed infrared light intensity (with highest intensity corresponding to closest proximity). Thus, modifying the intensity affects proximity calculations since increasing intensity will produce relatively higher sensed reflected light intensity values arising from a given target at a given distance. Thus, this value is typically modified only during calibration of the operation of the system.

An irminavesamp parameter 516 specifies a configurable value corresponding to a quantity of IR sensor signal samples that are acquired and then used to calculate an average IR measurement describing a value for a minIR parameter 532.

An irndmax parameter 518 specifies a configurable negative change maximum (with values specifying a range of maximum negative changes of 1000 to 20000. The control logic of the IR object detection system thus optionally limits the negative change in calculated proximity values. The maximum negative change value ensures against the IR sensor proximity calculator returning incorrect (too low values) after previously calculating a very high IR sensor signal intensity value. The value for irndmax 518 should be specified while considering that specifying too small a value may disable other logical tests relating to detecting excessive movement of an object while the system is in a waiting state for the object to become sufficiently still.

An iroffdeltafrac parameter 520 specifies a configurable fraction of the proximity measurement (intensity) value defining a "Off Delta Window" used by the liquid flow control logic to transition from the liquid flow "On" state to the "Off" state in response to movement of the detected object (assumed to be a vessel) away from the dispensing position.

An irval parameter 522 specifies a most recently measured/recorded IR sensor signal intensity value.

A lastirval parameter 524 specifies a previously recorded IR sensor signal intensity value read from the IR proximity sensor. The liquid flow control logic determines a difference between the lastirval parameter 524 value and the irval parameter 524 to calculate a speed and direction of movement of the object (bottle) within the field of view of the IR sensor.

A maxclrtime parameter 526 specifies a configurable time duration value used by the liquid flow control logic to determine whether an object has been detected within the field of view of the IR sensor for an excessive period of time. If the time duration is exceeded, the liquid flow control logic enters/registers an "Error" due to a blocked field.

A maxirclr parameter 528 (also referred to as Maximum Value Wait Empty) specifies a highest recorded IR sensor signal intensity while the liquid flow control logic is in a "Waiting to Clear" state—waiting for a currently sensed object to leave the IR sensor assembly field.

A minirclr parameter 530 (also referred to as Minimum Value Waiting to Clear) specifies a value corresponding to a minimum IR sensor signal intensity recorded while the system is in the "Waiting to Clear" state. The minirclr parameter 530 parameter value corresponds to a greatest displacement of the object within the IR sensor field of view. The minirclr parameter 530 value is used by the liquid flow control logic in conjunction with the irlthresh parameter 514 to determine whether an object has left the relevant field of view of the IR sensor, and the field of view is actually clear-causing the liquid flow control logic to transition from the "Waiting to Clear" to the "Off" state.

A minIR parameter 532 specifies a filtered minimum IR sensor signal intensity recorded in a relatively recent time period while the field of view is effectively empty. The minIR parameter 532 value is continuously calculated to establish a value approximating the minimum IR sensor signal (proximity) measurement recorded by the liquid flow control system in recent history. The minIR parameter 532 value is utilized, by the liquid flow control logic, as a "relative zero" level for determining if an object is within the object detection field of the IR sensor assembly.

A minstilltime parameter 534 (also referred to as Still Time Threshold) specifies a configurable time duration (e.g. 0.1 to 2.55 seconds) that the object must be relatively motionless (IR signal intensity is relatively stable) in the IR sensor's range for transitioning to the liquid flow control logic "On" state. The general idea is that an object (presumed to be a bottle) must be both in the IR sensor's field of view and not moving around (e.g. the user has determined the bottle is properly positioned under the dispenser's liquid outlet).

A minvaluewait parameter 536 stores a copy of the current value for the minIR parameter 532 at the time the liquid flow control logic transitions from the "On" to the "Waiting to Clear" state. The value of the minvaluewait parameter 536 value is updated only in response to the liquid flow control logic's transition from the "On" to the "Waiting to Clear" state.

An offdeltah parameter 538 specifies a configurable value used by the liquid flow control logic during the "On" state to provide an extended boundary to allowable movement towards the sensor (increasing the intensity of the IR sensor signal) before the liquid flow control logic transitions to the "Waiting to Clear" state. The value of the offdeltah parameter 538 establishes an upper boundary for a sensor signal intensity value that will be treated as a signal arising from a still object. Setting the value to zero disables this feature of the liquid flow control logic.

An offdeltal parameter 540 specifies a configurable value used by the liquid flow control logic during the "On" state to provide an extended boundary to allowable movement away from the sensor (decreasing the intensity of the IR sensor signal) before the liquid flow control logic transitions to the "Waiting to Clear" state. The value of the offdeltal parameter 540 establishes a lower boundary for a sensor signal intensity value that will be treated as a signal arising from a still object. Setting the value to zero disables this feature of the liquid flow control logic.

An ondelta parameter 542 specifies a configurable IR sensor signal intensity change value used during operation of the liquid flow control logic, while operating in the "Off" state, to determine whether a running "still" time duration value can be incremented.

A softerrlim parameter 544 specifies a configurable value specifying a maximum time the liquid flow control logic can be in a "Soft Error" state arising from a detected blocked field of view of the IR sensor before transitioning to a "Hard Error" state. In an illustrative example, Soft Error conditions are handled locally through remedial actions such as displaying a message on a display of the liquid dispensing station. Hard Error states result in communications being issued by the liquid dispensing station communicating an electronic message that is passed to, for example, a cloud server for committing to a database that, in turn, creates escalated notifications for taking further action. This may also, for example, cause the liquid dispensing station itself to store a record of the error event for future use in diagnostics.

A stilltime parameter 546 specifies a timer duration value corresponding to how long an identified target has been continuously motionless. The stilltime parameter 546 is used to measure the continuous still time in the "Off" state for the liquid flow control logic.

A flowtime parameter 547 specifies a timer duration value associated with the "On" state of the control logic. The duration specified by the flowtime parameter 547 corresponds to how long liquid has flowed continuously since the liquid flow control logic transitioned to the "On" state.

Similarly, a waittime parameter 548 specifies a timer duration value associated with the "Waiting to clear" state of the control logic. The duration specific by the waittime parameter 548 corresponds to how long the IR sensor has sensed an object in the field of view since the liquid flow control logic transitioned to the "Waiting to Clear" state.

Turning to FIGS. 6A-6G, a set of flowcharts summarize operation of exemplary liquid flow control logic carried out by the control processor of the liquid dispenser station. During an initialization operation 600 the controller loads a set of pre-configured values for the parameters governing operation of the infrared (IR) sensor assembly to begin acquisition of infrared sensor signal readings. Thereafter, during 602 if the IR sensor signal is able to provide sensor values for use by the liquid flow control logic, then control passes to step 604, wherein a set of parameter values governing operation of the liquid flow control logic (previously discussed herein above with reference to FIG. 5) are loaded in preparation for full operation of the control logic and the liquid flow control logic enters an "off" state (see FIG. 6B, flowchart connector "1"). Alternatively, if during step 602 the IR sensor readings cannot be read, then control passes to 606 wherein the liquid flow control logic records an IR sensor error that is reported in an error message issued by the liquid dispenser station to a central maintenance server. Thereafter, the system enters a shut-down state as the processor operation ends until the system can be repaired and re-started.

Figure 6A:
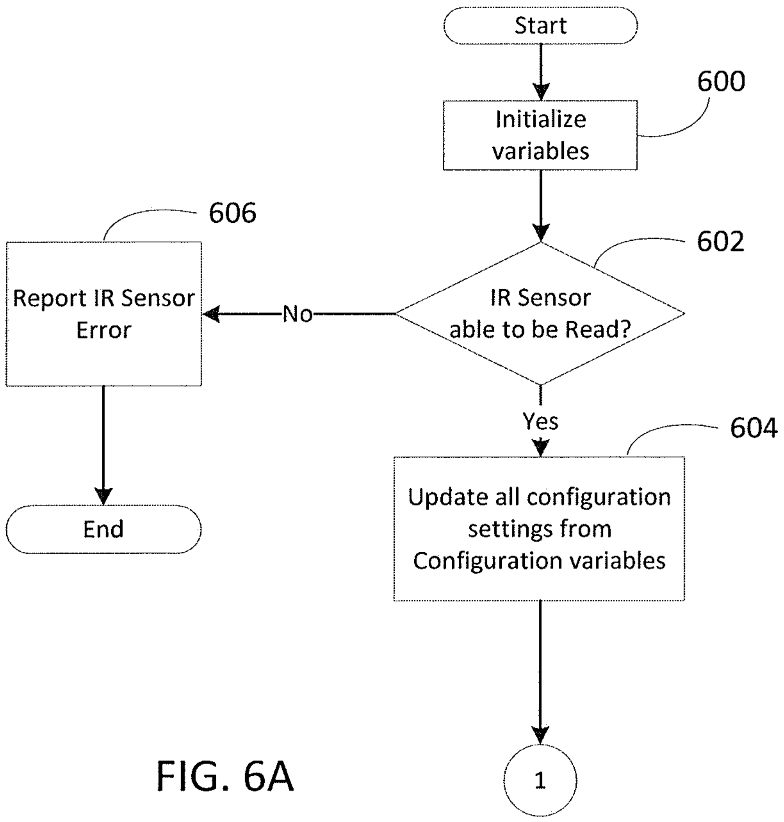
FIGS. 6A-6G are a flowchart summarizing operation of a state-based IR sensor-based liquid flow control logic for a filler of a liquid dispensing station.
Figure 6B:
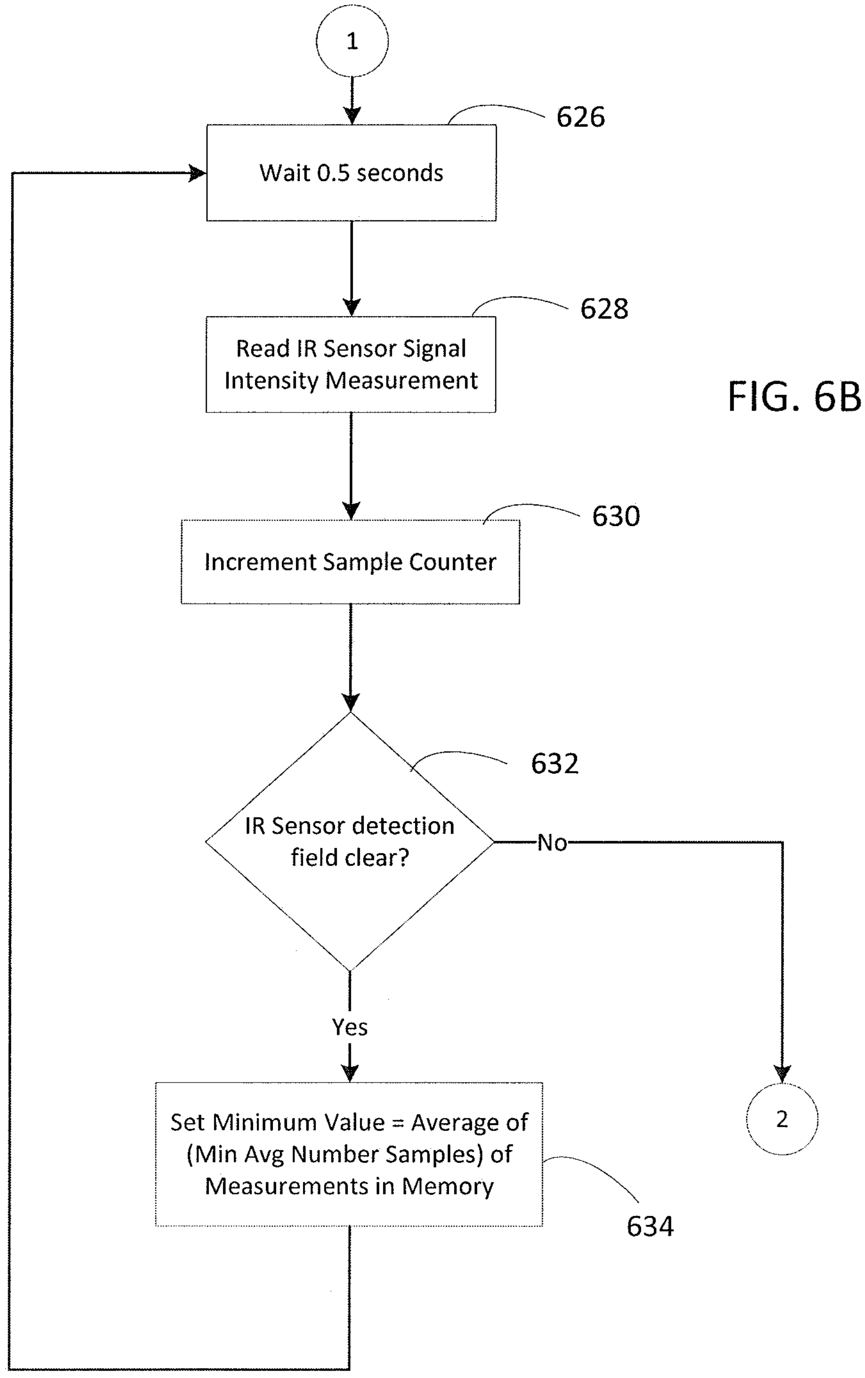

Turning to FIG. 6B, the liquid flow control logic executes a configured wait at 626. By way of example, the wait period is 0.5 seconds. However, longer and shorter wait times are used in alternative embodiments. Moreover, in embodiments the wait period is configurable to facilitate tuning of the operation of the liquid flow control logic. After the configurable wait is completed, control passes to 628 wherein the liquid flow control logic accesses/receives a current IR sensor measurement (stored in the irval 522), and an IR sample counter is incremented at 630. The IR sample counter identifies a current number of consecutive "zero" (empty IR sensor field) samples received and processed by the controller 206. In an exemplary embodiment, a configurable minimum of N samples (stored in the irminavesamp 516) are required before the minIR 532 value is considered valid for use by the liquid flow control logic.

Thereafter, during 632 the liquid flow control logic determines, based upon the currently sensed value of the IR sensor signal, whether the IR Sensor detection field is clear. In particular, at 632 the liquid flow control logic compares the new value of the IR sensor signal, which was read/received during 628, to a specified/calculated minimum IR sensor signal level considered to be representative of an object present within the field of view of the IR sensor for the liquid dispenser station. In an exemplary embodiment, the minimum (threshold) value for deciding that an object is in the field of view of the IR sensor is a summation of: (1) a current zero/clear field IR sensor value (stored in the minir 532), the low threshold value (stored in the irlthresh 512), and the turn-on hysteresis (stored in the hyster 508). By using the above-provided summation, insignificant increases in IR sensor signal intensity are "rejected" by the liquid flow control logic. If the new value of the IR sensor signal does not meet the minimum detection signal, then control passes to 634.

In a particular embodiment, rather than specify a fixed "zero" level (corresponding to a clear IR sensor field of view) the zero level is continuously updated to accommodate a potentially changing IR sensor signal value over the course of time (e.g. various times of day due to sunlight or other sources of infrared light). Thus, at 634, the liquid flow control logic re-calculates an updated value for the filtered zero level signal stored in the minIR parameter 532. In an exemplary embodiment, the filtered zero level signal is an average of the most recent "N" (irminavesamp 516) IR sensor signal values. In an alternative embodiment a filtering operation is performed by applying a weight to the current signal value and a second weight to the current filtered IR sensor signal value. Thereafter, control passes in the liquid flow control logic from 634 to the wait operation at 626.

Figure 6C:
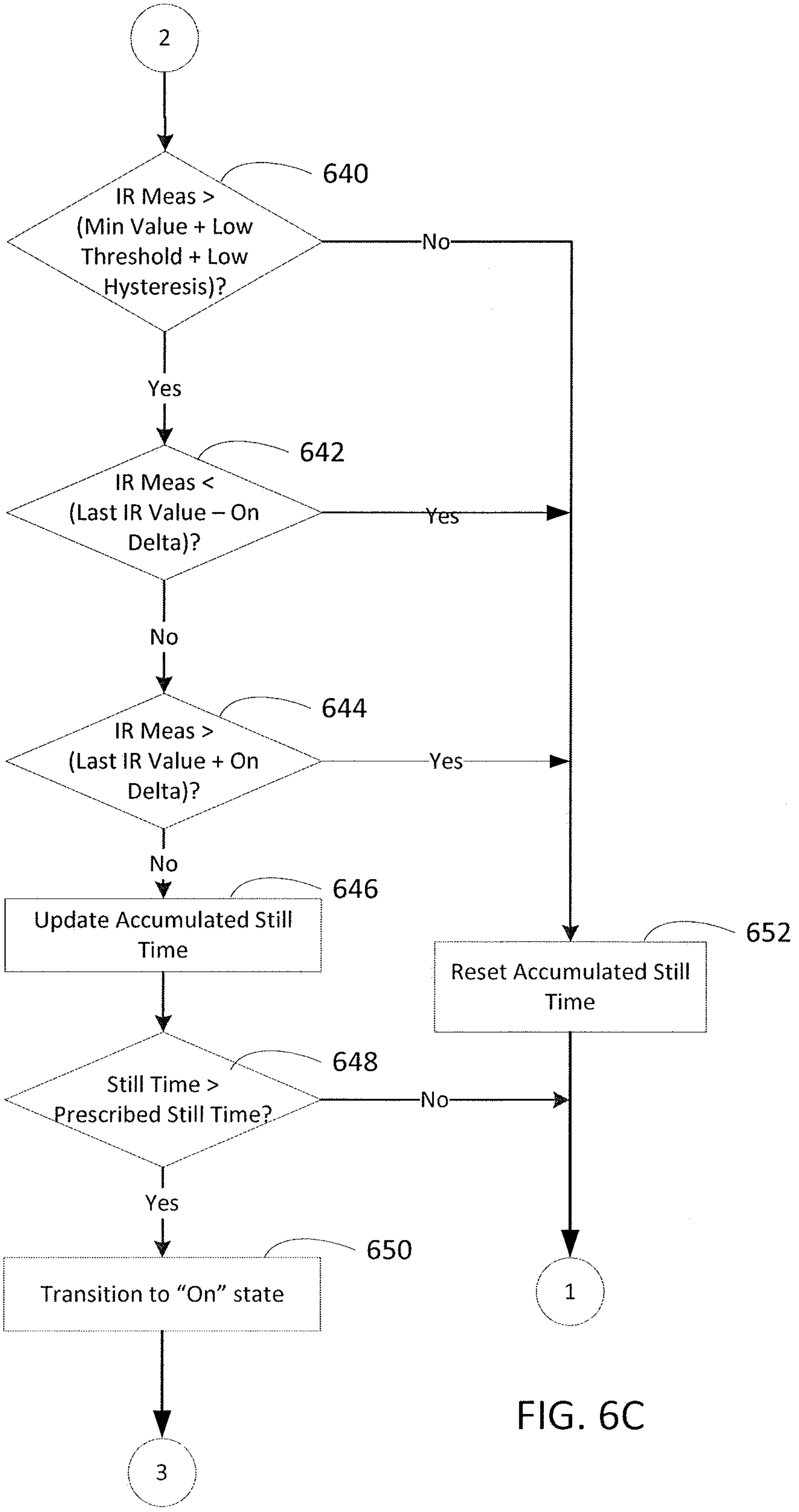

On the other hand, if at 632 the liquid flow control logic determines that the sensor detection field is not clear (based upon the IR sensor signal value), then control passes from 632 to 640 (FIG. 6C connected at connection point "2"). During 640, the liquid flow control logic remains in the "Off" state (where liquid does not flow). However, further steps are performed that, if successful in showing that an object remained sufficiently still in the IR sensor field for a configured wait period (specified by minstilltime parameter 534), the liquid flow control logic transitions to the "On" state. The steps summarized in FIG. 6C are intended to demonstrate the exemplary steps for establishing the prescribed requirements for commencing liquid flow at the dispenser station.

Initially, during state 640, the control logic ensures that the IR signal sensor is sufficiently strong to register as an object being present within the field of view of the IR sensor assembly. By way of a particular example, the current IR sensor signal is sufficiently strong if it exceeds a sum of: (1) a current zero/clear field IR sensor value (stored in the irminavesamp 516), the low threshold value (stored in the irlthresh 512), and the turn-on hysteresis (stored in the hyster 508). If the signal is sufficiently strong, then control passes to 642 wherein the liquid flow control logic commences further tests to determine whether the object in the IR sensor field of view is sufficiently still. Since movement can either increase or decrease the IR sensor signal reading comparisons are made to upper and lower change boundaries of a range defined by the previous IR sensor value (lastirval 524) and the acceptable sensor reading change (ondelta 542).

Thus, in the illustrative example, at 642 a first test determines whether the current IR sensor signal value has dropped too much. By way of example, the liquid flow control logic determines whether the current IR sensor measurement (irval 522) is less than the last IR sensor measurement (lastirval 524) minus a specified delta value (ondelta 542). If the comparison shows that the IR measurement has not dropped more than the specified delta value, then control passes to 644.

During 644 a second test determines whether the current IR sensor signal value has increased too much. By way of example, the liquid flow control logic determines whether the current IR sensor measurement (irval 522) is greater than the last IR sensor measurement (lastirval 524) plus a specified delta value (ondelta 542). In the illustrative example, the same specified delta value is used to determine the upper and lower boundaries for acceptable change in the IR sensor signal value. However, two distinct values can be used for upper and lower boundaries—especially in the case where the increases tend to be more sensitive than decreases in signal sensor value when an object moves in the IR sensor's field of view. Continuing with 644, if the comparison shows that the IR measurement has not increased more than the specified delta value, then control passes to 646 where the accumulated still time (stilltime 546) is updated.

Thereafter, control passes to 648 wherein if the accumulated still time (stilltime 546) exceeds the prescribed still time for commencing fluid flow (minstilltime 534), then control passes to 650 wherein the liquid flow control logic transitions to the "On" state. Thereafter, control passes to 660. See FIG. 6D, connection point "3".

If, at 648, the liquid flow control logic determines the prescribed still time (minstilltime 534) has not yet been reached, then control passes to 626 where a wait period is executed before a next IR sensor value is acquired at 628. See FIG. 6B, connection point "1".

Returning to step 640, if the IR sensor signal is determined to be too weak, then control passes to 652 wherein the accumulated still time value (stilltime 546) is reset to zero and the preliminary sensing period essentially restarts when control returns to 626.

Similarly, if the IR sensor value changed too much, as determined by the comparison performed during either 642 or 644, then control passes to 652.

Figure 6D:
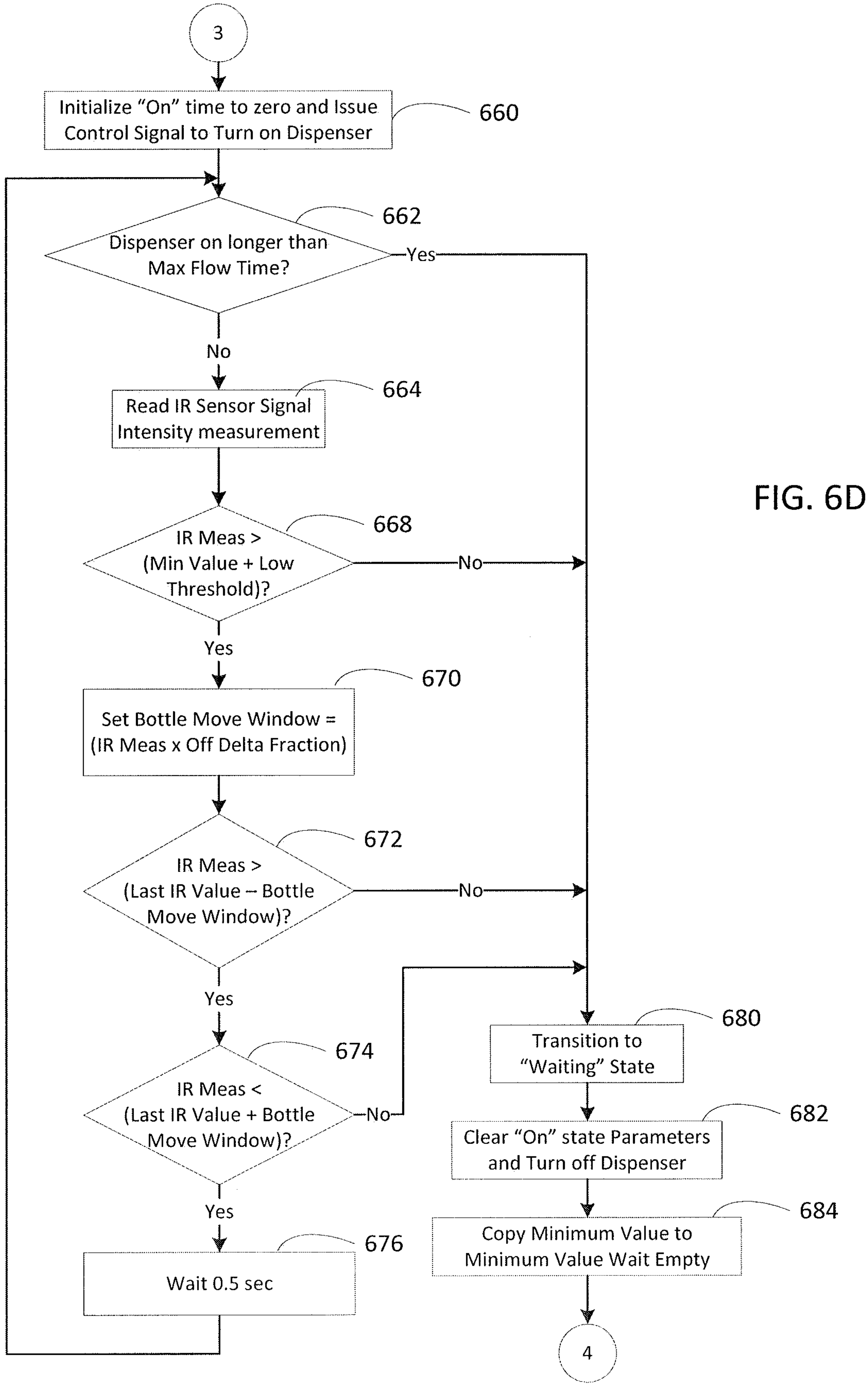

Turning to FIG. 6D, a set of operations are identified that are associated with the "On" state. In general, during the "On" state the liquid flow control logic is primarily concerned with detecting that the object (bottle) is still properly positioned for filling with a dispensed liquid. However, the logic also ensures that the bottle/object is not present for too long (leading to waste or damage). Thus, during 660 the liquid flow control logic initializes the accumulated continuous "On" state time parameter value (flowtime 547) to zero and then issues a control signal to turn on the liquid dispenser (e.g., open a liquid dispensing valve). Control then passes to 662 wherein if the accumulated continuous "On" state time value (flowtime 547) does not exceed a prescribed maximum flow time (bmaxflow 502), then control passes to 664.

During 664, the liquid flow control logic accesses/receives a current IR sensor measurement (stored in the irval 522). The previous IR sensor measure is re-assigned as the previous IR signal value (lastirval 524). Control then passes to 668.

During 668, the controller initially determines whether the object to be filled is still present. In the illustrative example, such determination is made by comparing the current IR value (irval 522) to a minimum value considered to indicate an object within the IR sensor assembly's field of view. By way of example, the minimum value is a summation of: (1) a current value of the average empty field IR signal value (irminavesamp 516), and (2) a low threshold value (irlthresh 510). If the current IR value exceeds the minimum value for object presence, then control passes to 670.

During 670, 672 and 674 the liquid flow control logic compares a previous IR signal value (lastirval 524) and to a current IR signal value (irval 522) to determine whether the object is sufficiently motionless to continue liquid flow. However, rather than using a fixed value, in accordance with a particular embodiment the control logic, during 670, 672 and 674 uses a fraction/percentage of a measured IR parameter (e.g., irval 522) value to establish an acceptable upper and lower range boundary for differences between consecutive IR sensor signal values. In an alternative embodiment the lower limit and upper limit of the range could be determined by separate fraction/percentages of the measured IR parameter to account for differences in IR response associated with approach vs. departure.

Thus, during 670 the dynamic signal variation range ("bottle move window" above/below a previous IR sensor signal value) for detecting excessive sensor signal value change (bottle movement) is calculated as a product of the current measured IR parameter value (irval 522) and a configured fraction value (iroffdeltafrac 520). Thereafter, during step 672, if the current IR measurement is above a signal floor value determined by subtracting the "bottle move window" value from the previous IR value (lastirval 524), then control passes to 674.

During 674, if the current IR measurement is below a signal ceiling value determined, for example, by adding the "bottle move window" value to the previous IR value (lastirval 524), then the bottle has remained sufficiently motionless to continue liquid flow, and control passes to 676 where the control logic performs a configured wait (e.g. 0.1 seconds) before returning to 662.

Returning to 668, if the current IR signal sensor measurement is too weak to meet the initial minimum threshold, then control passes to 680.

During 680, the control logic transitions to a "Waiting to Clear" state comprising operations described herein below with reference to FIG. 6E. During 682 "On" state parameter values (e.g., flowtime 547) are cleared and the waittime parameter 548 associated with the time duration of control logic's current continuous time in the "Waiting to Clear" state is reset to zero. Additionally, during 684 a copy of the current minimum IR average (minIR 532) is copied to a minimum IR value while waiting to clear parameter (minvaluewait 536). Thereafter, control passes to 690. See FIG. 6E, connection point "4".

Returning to 672 and 674, if the control logic determines that the current IR value is either too small or too large, and thus falling outside the dynamic acceptable IR sensor signal change range defined by the previous IR sensor value and the "Bottle Move Window", then control passes to 680.

Figures 6E, 6F:
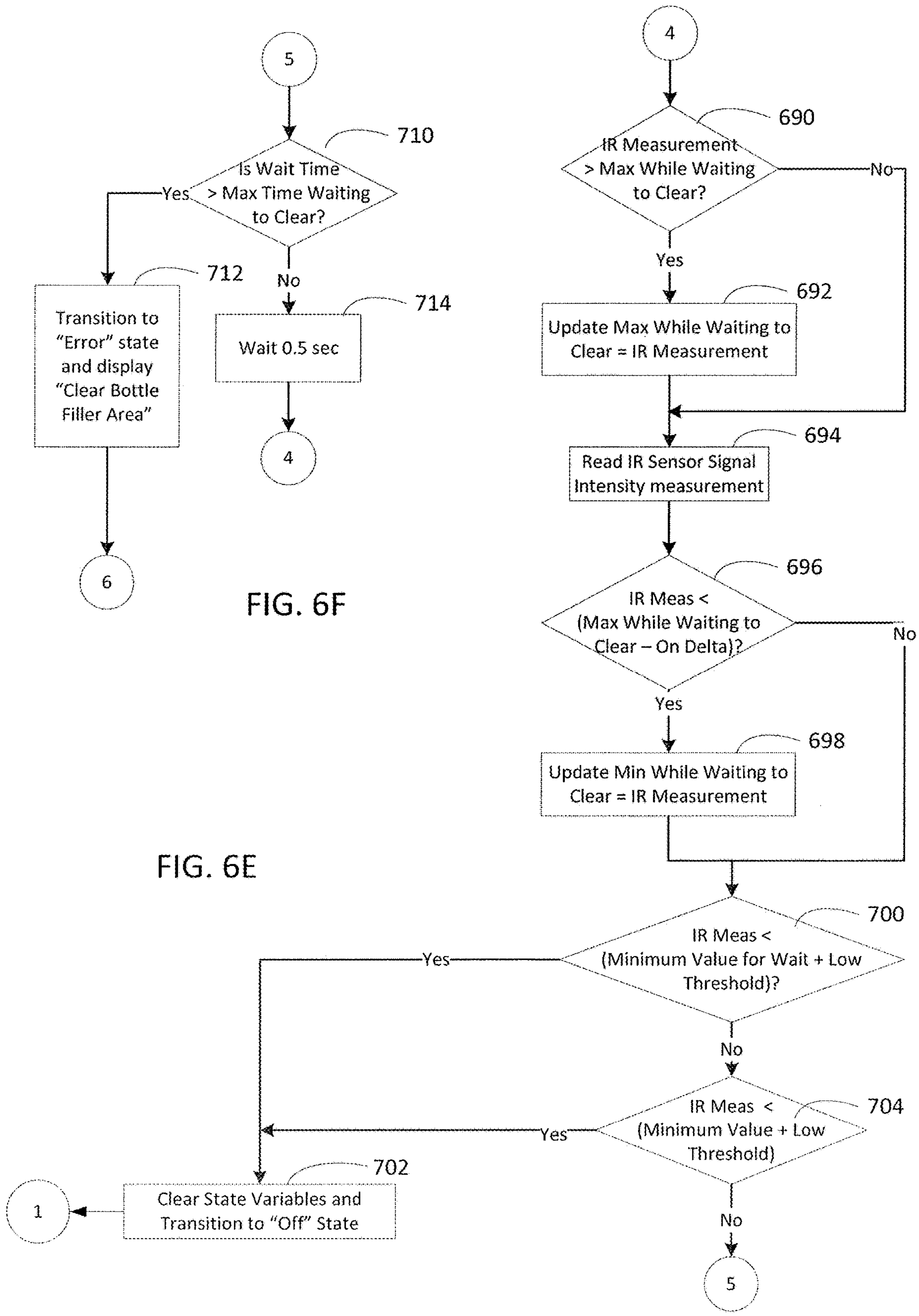

Turning to FIGS. 6E and 6F, a set of operations associated with a "Waiting to Clear" state of the control logic are summarized. While in the "Waiting to Clear" state, the liquid flow control logic monitors the IR sensor readings while potentially waiting for removal of the previously detected object from the field of view of the IR sensor assembly. A maximum IR sensor value (maxirclr 528), initially reset upon entry into the Waiting to Clear, is tracked by the control logic operating in the "Waiting to Clear" state. Thus, during 690 if the current IR signal sensor measurement (irval 522) is greater than a current maximum IR value while waiting to clear (maxirclr 528), then control passes to 692 wherein the maximum IR sensor value is updated. Thereafter, control passes to 694 wherein a next IR sensor signal intensity measurement is acquired. Control then passes from 694 to 696.

Returning to 690, if the IR measurement is not greater than the current maximum IR sensor reading, then control passes to 694.

During 696, the control logic performs a test to ensure that an empty field IR value (minimum IR value) is appropriately updated in response to a degradation to the sensor assembly (e.g. water drop splashed on a lens of the IR sensor assembly) operation. In particular, if the current IR sensor value (irval 522) is less than a threshold minimum established by subtracting a configured "delta" value (ondelta 542) from the above mentioned maximum IR sensor value (maxirclr 528), then control passes to 698 wherein the current IR measurement (irval 522) is assigned to the minimum while waiting to clear parameter (minvaluewait 536). This temporary assignment is intended to accommodate temporary changes in the IR sensor assembly's operating characteristics due to, for example, water on a lens. The time-averaged/filtered minimum IR value (minIR 532) is not changed while the control logic occupies the "Waiting to Clear" state. Control passes from 698 to 700.

If during 696, the IR Measure is greater than the calculated difference (maxirclr 528–ondelta 542), then control passes to 700.

During 700, a first of two comparisons are made to determine whether the IR sensor field is cleared. In particular, if the current IR measurement is less than a calculated sum of the minimum value while waiting to clear (minvaluewait 536) and a low threshold (irlthresh 512) value discussed herein above with reference to FIG. 5, then control passes to 702 (the IR sensor field is sufficiently clear).

During 702, the control logic clears all state variables (e.g. maxirclr 528, minvaluewait 536, waittime 548) associated with the "Wait to Clear" state and then transitions to the "Off" state and, in particular, 626 where a wait operation is executed while the control logic is in the "Off" state.

Additionally, if the initial test for a clear field fails during 700, control passes from 700 to 704 wherein a second IR sensor field clearing test is performed. However, in this case the minimum IR (minIR 532) value is used in place of the Minimum Value for Wait (minvaluewait 536) value. During 704, if the current IR measure is less than the calculated sum of the minimum IR (minIR 532) and the low threshold (irlthresh 512), then control passes to 702.

On the other hand, if the IR Measurement is too large to pass the test of 704, then control passes to 710. See FIG. 6F, connection point "5".

Turning to FIG. 6F, the description of the "Wait to Clear" state continues with reference to 710 wherein the control logic performs a further test regarding the accumulated waiting time in the "Waiting to Clear" state. In an illustrative embodiment, the control logic uses the "Waiting to Clear" time accumulator (waittime 548) to store an accumulated continuous time period within the "Waiting to Clear" state. During 710, if the accumulated wait time, specified by the waittime 548 accumulator for the "Wait to Clear" state, exceeds a specified maximum time for waiting to clear specified by the maxclrtime 526, then control passes to 712.

During 712 the liquid flow control logic enters an "Error" state where commands are executed to cause a display of an error message for a user of the liquid dispenser station (e.g. "Clear Bottle Filler Area"), and control then passes to 720. See FIG. 6G, connection point "6".

On the other hand, if the current wait time does not exceed the maximum wait time, then control passes to 714. During 714, the 714 the control logic executes a configurable wait cycle (e.g. 0.5 seconds) and then returns to 690. See FIG. 6E, connection point "4".

Figure 6G:
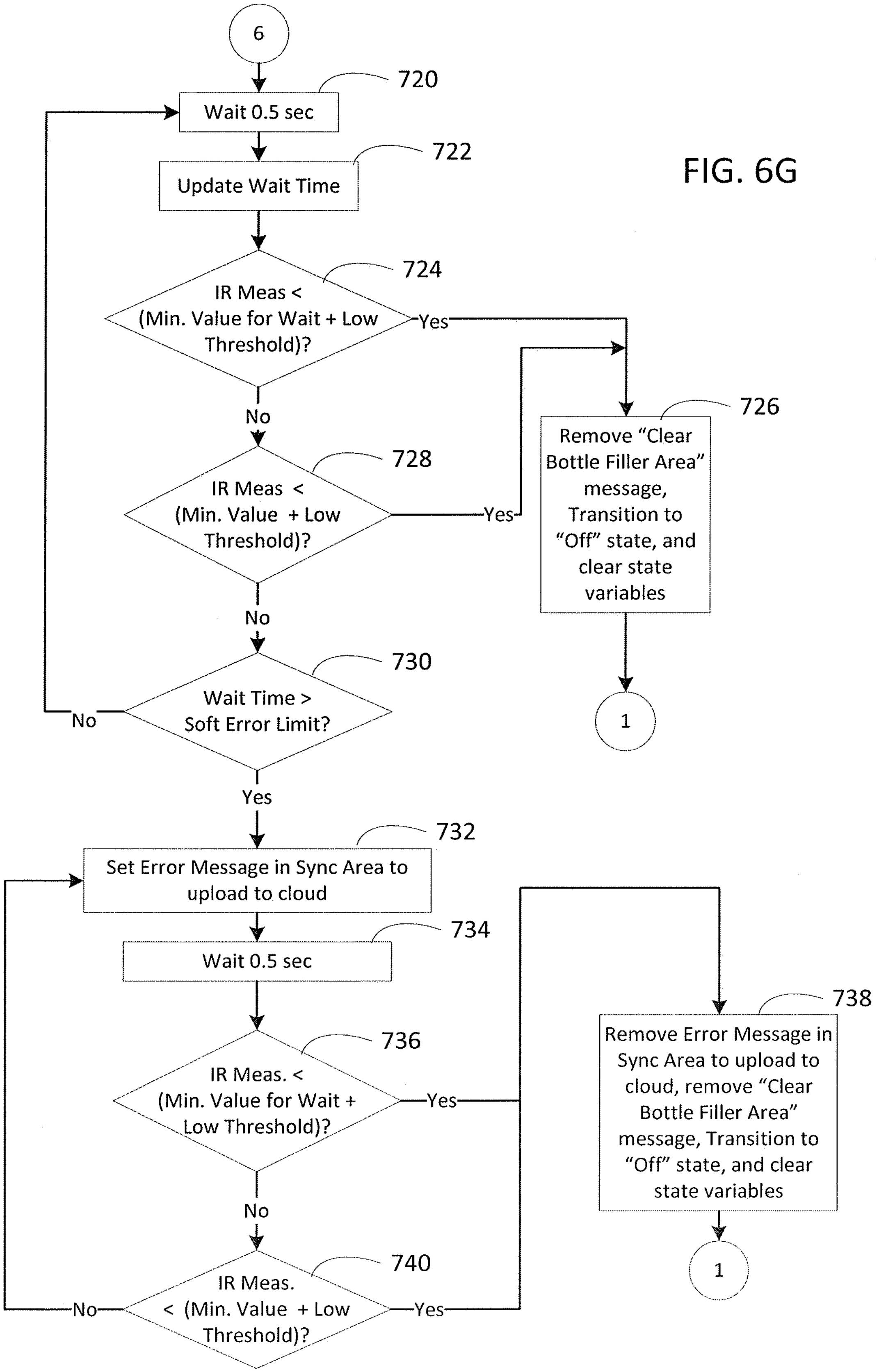

Turning to FIG. 6G, further operations associated with an "Error" state are summarized. During 720 the control logic initially executes a configured wait (e.g. 0.5 seconds). During 722 the wait time accumulator (waittime 548) is updated. Thereafter, at 724 the control logic commences a test to determine whether the current error state is a "soft" error (IR sensor assembly field of view is being blocked by an object) or a "hard" error (hardware malfunction or abusive use of dispenser station).

In particular, during 724, a first of two comparisons is made to determine whether the IR sensor field is cleared. In particular, if the current IR measurement is less than a calculated sum of the minimum value while waiting to clear (minvaluewait 536) and a low threshold (irlthresh 512) value discussed herein above with reference to FIG. 5, then control passes to 726 (the IR sensor field is sufficiently clear).

During 726, the control logic: removes the previously displayed "Clear Bottle Filler Area" message displayed by the dispenser station, clears all state variables (e.g. maxirclr 528, minvaluewait 536, waittime 548) associated with the combined continuous duration of the "Waiting to Clear" and "Error" states occupied by the liquid flow control logic and then transitions to the "Off" state and, in particular, 626 where a wait operation is executed while the control logic is in the "Off" state.

Additionally, if the initial test for a clear field fails during 724, control passes from 724 to 728 wherein a second IR sensor field clearing test is performed. However, in this case the minimum IR (minIR 532) value is used in place of the Minimum Value for Wait (minvaluewait 536) value. During 728, if the current IR measure is less than the calculated sum of the minimum (minIR 532) and the low threshold (irlthresh 512), then control passes to 726.

On the other hand, if the IR Measurement is too large to pass the test of 728, then control passes to 730. During 730 the control logic determines whether the accumulated wait time (waittime 548) in the "Error" state has exceeded a configured soft error wait limit (e.g. 5 minutes). If the current accumulated continuous time in the error state does not exceed the soft error time limit, then control returns to 720.

On the other hand, after the soft error time limit is exceeded, the control logic passes from 730 to 732. During 732 the control logic issues a hard error message to a message synchronization area of local management service/server for subsequent uploading to a notifications area of a cloud server to cause the creation/scheduling of a maintenance request for the malfunctioning dispenser station and/or local storing of the event in a database or table. Control then passes to 734 wherein the liquid flow control logic executes a configured wait (e.g. 0.5 seconds) before control passes to 736 to determine whether the error condition has been resolved.

During 736, a first of two comparisons are made to determine whether the IR sensor field is cleared. In particular, if the current IR measurement is less than a calculated sum of the minimum value while waiting to clear (minvaluewait 536) and a low threshold (irlthresh 512) value discussed herein above with reference to FIG. 5, then control passes to 738 (the IR sensor field is sufficiently clear).

During 738, the control logic: removes/recalls the previously uploaded error message to a maintenance service/server, removes the previously displayed "Clear Bottle Filler Area" message displayed by the dispenser station, clears all state variables (e.g. maxirclr 528, minvaluewait 536, wait time 548) associated with the "Error" state and then transitions to the "Off" state and, in particular, 626 where a wait operation is executed while the control logic is in the "Off" state.

Additionally, if the initial test for a clear field fails during 736, control passes from 736 to 740 wherein a second IR sensor field clearing test is performed. However, in this case the minimum IR (minIR 532) value is used in place of the Minimum Value for Wait (minvaluewait 536) value. During 740, if the current IR measure is less than the calculated sum of the minimum (minIR 532) and the low threshold (irlthresh 512), then control passes to 738.

On the other hand, if the IR Measurement is too large to pass the test of 728, then control returns to 732.

A model-based predictive temperature control is described herein below for a cooled water reservoir and supply pre-cooler (carrying the liquid before entering the reservoir) of the evaporator 203. As used herein, a "predicted liquid temperature" is a model-based temperature corresponding to an expected future sensor output if the system were to be allowed to reach equilibrium (without additional disruptive input) such that the temperature sensor body equaled the temperature of the liquid. In this regard the "predicted liquid temperature" is generated by applying a transfer function to actual temperature sensor (e.g., temperature sensor 211 for the evaporator 203) measurements. As such, the predicted liquid temperature is a model-based estimate of a current temperature reading that would be produced by a direct measurement of the liquid of interest.

The model/control scheme is derived from the thermal circuit topology depicted in FIG. 8. By way of example, the calculations and responsive control signal determinations are implemented by the water manager component 306 in accordance with temperature event processing when an event monitoring state machine is invoked (in response to a detected temperature measurement) during 445. Hysteretic control of a temperature control can be augmented to generate a prediction of the actual water temperature given sensor readings external to the system core. By appropriately considering the plant thermal dynamics and applying a mathematical algorithm that inverts the dynamics to generate a prediction of the internal temperature the previously defined hysteretic control system can function with tighter control. A model for the system's heat transfer will be generated below that has two parameters (a and b) which can be tuned in the configuration of the controller 206 of the LDS, such as liquid dispenser station 106(1), to match the particular system being controlled. The system topology is shown, in the form of a simplified thermal circuit, in FIG. 8.

While thermodynamic flows in the system are complicated to model, a simplified system is appropriately used, in the present case, to generate an understanding of the system control requirements for a liquid dispenser station including a cooling unit having a cooled liquid reservoir in thermal contact, via a metallic thermal conduction path, with an evaporator coil.

With continued reference to the thermal circuit depicted in FIG. 8, in a no load operating environment of the LDS (where there is no water being passed through the system), the hysteretic control turns on the compressor once the temperature sensor 211 for the evaporator 203 exceeds a given warm threshold. The evaporator 203 coil quickly cools the metallic mass of the system which will eventually cool both the temperature sensor and the water. However, there is a time delay in both the sensor reading and the water cooling that should be accounted for to make the control both more accurate and more robust.

In that regard, the relation of actual int erest is the relation between the water temperature (liquid thermal mass 804) to the sensor temperature (temperature sensor thermal mass 806) and the discussion below concerns predicting the liquid temperature (liquid thermal mass 804) given the historical temperature readings provided by the temperature sensor (corresponding to the temperature sensor thermal mass 806) up to present. If the current temperature is 5° C. and the last minute of readings is 5° C. a predictive algorithm predicts that the actual water temperature is 5° C. However if the currently sensed temperature is 4.7° C. and recently the temperature was read at 5° C. then a properly modeled prediction of the actual current liquid temperature that will be registered by the temperature sensor 211 at a future point in time when the system reaches thermal equilibrium (referred to herein as the "predicted liquid temperature") could successfully/accurately determine at present that the current water temperature (that will not be registered by the temperature sensor until some later time) is actually much lower than currently sensed 4.7° C. with knowledge of a system cooling model a priori. During a cooling cycle, the controller 206 uses the predicted liquid temperature to switch off the compressor 201 sooner which will keep the actual water temperature, sensed after a delay by the temperature sensor 211 of the evaporator 203, from undershooting the desired compressor shutoff threshold temperature.

The prediction of a final registered temperature works in both directions (i.e., for predictions of actual liquid temperature for both temperature increases and temperature decreases). For instance if the sensed temperature of the liquid is within a dead band (a range of temperatures wherein the compressor 201 is not turned on) and water is being consumed, then the temperature sensed by the temperature sensor 211 will start to rise. A temperature prediction is calculated that renders a predicted temperature value that is higher than the currently registered temperature reading by the temperature sensor 211. The higher value of the predicted temperature (for a rising liquid temperature) results in the controller 206 activating the compressor 201 before the temperature sensor 211 actually registers a temperature exceeding a threshold temperature for activating the compressor 201.

FIG. 9 depicts an exemplary high level flow of operations performed by the controller 206 to convert a current reading by the temperature sensor 211 into the "predicted liquid temperature." An initial actual current temperature reading 900 is provided to a transfer function 902 which is frequency domain representation (Laplace Transformed) in continuous time where $s=\sigma+j\omega$ (a complex variable) and a and b are field tunable coefficient parameters that are adjusted to adapt the predicted temperature computations performed by the controller 206 to the given system and/or operating conditions. The system model may change based upon what is occurring (i.e., the operating state of the LDS). By way of example a set of transfer functions are provided for a variety of sensed operating modes of an LDS including, for example: (1) dispenser not currently dispensing and temperature rising above threshold, (2) dispenser currently dispensing and temperature rising above threshold, (3) dispenser currently not dispensing and temperature dropping (during a compressor activation period), etc. The application of the transfer function 902 to the reading supplied by the temperature sensor 211 renders a predicted future sensor temperature 904 for the actual current temperature of the liquid.

Figure 10:
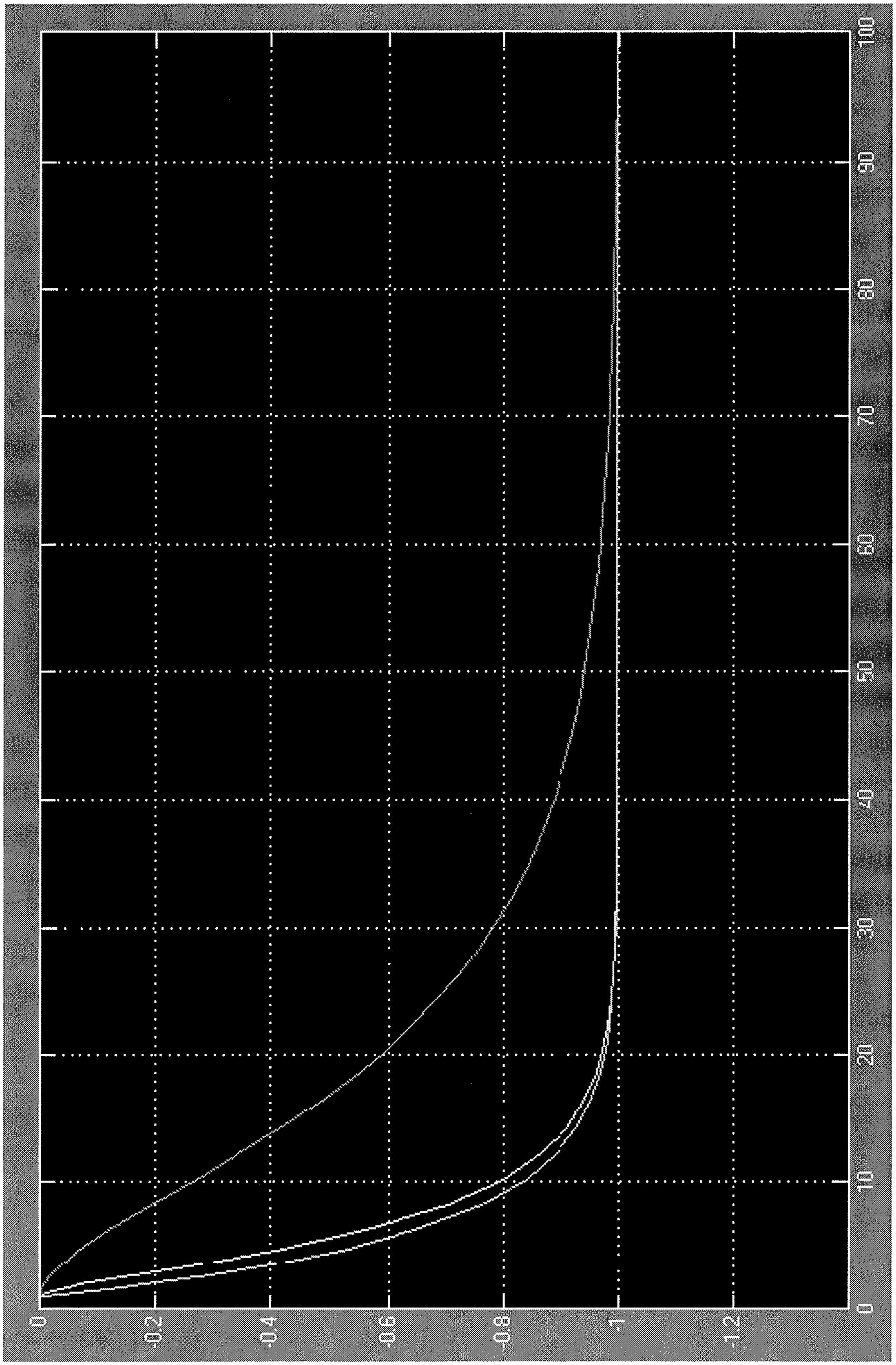
FIG. 10 is a set of three graphs including a first line representing an actual system temperature over time, a second line representing a measured temperature, and a third line representing a predicted temperature based upon a transfer function applied to the measure temperature data represented by the second line.
Figure 11:
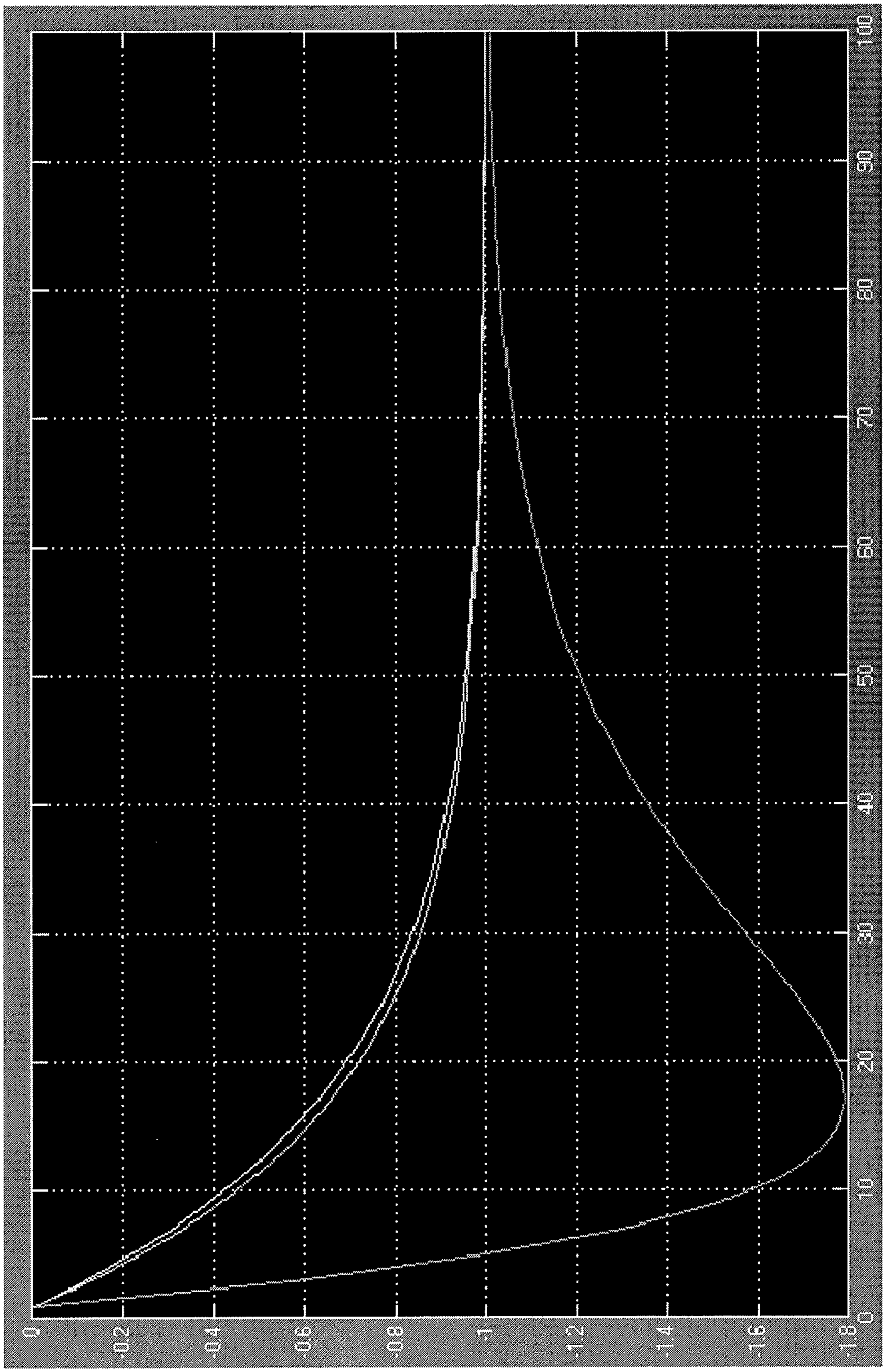
FIG. 11 is a second set of three graphs including a first line representing an actual system temperature over time, a second line representing a measured temperature, and a third line representing a predicted temperature based upon a transfer function applied to the measure temperature data represented by the second line.

Turning to FIGS. 10 and 11, examples of temperatures over time for an illustrative system are provided below that demonstrate substantial time lag between measured and actual temperature during cooling. In FIG. 10, the measured temperature is greater than the actual temperature of the liquid and the measured and actual temperatures do not converge until about 70 seconds into the measurement period. FIG. 10 shows a simulated response of a thermal system. The vertical scale is percent and could represent any negative amplitude of temperature change. A first line indicates an actual system temperature change. In FIG. 10, after about 30 seconds the actual temperature of the system reaches a final temperature. A second line, that is generally above the first line from time zero to 70 seconds, shows the measured temperature of the system (e.g., by the temperature sensor 211 of the evaporator 203) and takes almost 3 times longer to register the correct temperature. A third line, that slightly lags the actual measurements (line 1) but converges at about 30 seconds, corresponds to the predicted temperatures 904, rendered by the controller 206, by applying the transfer function 902 to input actual temperature readings 900.

Applying a first order transfer function (with coefficients of a=15, b=1, giving the transfer function 902 (15 s+1)/(s+1)) to the measured temperature values (the second line) renders the predicted temperatures (the third line). The calculated predicted temperature values (904) are thereafter utilized by the controller 206 to turn off the compressor 201 during a cooling cycle based upon input temperature sensor values 900 provided by the sensor 211 (corresponding to the second line of FIG. 10) that are potentially nowhere near the actual temperature of the liquid. It can be seen that during changes to the liquid temperature (in this case cooling) the predicted temperatures provide a more accurate representation of the actual current temperature of the liquid than the measured temperature provided by the sensor 211. Applying the predicted temperatures to control decisions regarding the system will result in much better control.

Turning to FIG. 11, a second (more complex) simulation was also conducted to simulate the response of the liquid cooling control system. In FIG. 11, the metallic and water thermal mass of the system was considered. The simulation represented in FIG. 11 shows the measured temperature, a first line where the temperature dips considerably. A second line, which consistently drops over the passage of time corresponds to the actual water temperature. The initial excessive drop in the temperature sensed by temperature sensor 211 is due to the conducted temperature from the evaporator 203 through the sensor 211 via the metallic mass of the system. Once the compressor 201 turns off, the metallic mass of the system stays cooled by evaporating gas in the system but is warmed by the water as it cools. Eventually the water temperature matches the sensor temperature (when the first and second lines converge at 100 seconds) as the system stabilizes at equilibrium. Applying the first order transfer function to the measured temperature with (a=9, b=50) giving (9 s+1)/(50 s+1) provides the sequence of predicted temperatures (a third line closely tracking the second line of actual liquid temperature).

The two cases depicted in FIGS. 10 and 11 illustrate the effect of the two coefficient variables “a” and “b” in the transfer function 902. In the first simulation “a” was increased to 15 which makes the output signal more responsive. Essentially, the input signal was slow to respond so by increasing “a” to 15 the output signal overreacts to the input signal and cancels the time delay in the system. In the second example “b” was increased (in comparison to the first example) to damp the output signal compared with the input signal which helped match the actual temperature response.

However there are also effects between “a” and “b” that are difficult to explain in practical terms. Therefore, turning to FIG. 12, a clearer summary of the math applied by the controller to render the desired series of predicted temperatures. The system temperature is insulated from the temperature reading by a first order transfer function which is natural to the system which delays the correct temperature reading. By applying the secondary transfer function the temperature can be more closely predicted. Notice the repetition of the (15 s+1) term in the transfer functions in Equation 1 below.

$$\frac{1}{(15s+1)}\frac{(15s+1)}{(s+1)}=\frac{1}{(s+1)} \tag{1}$$

Figure 13:
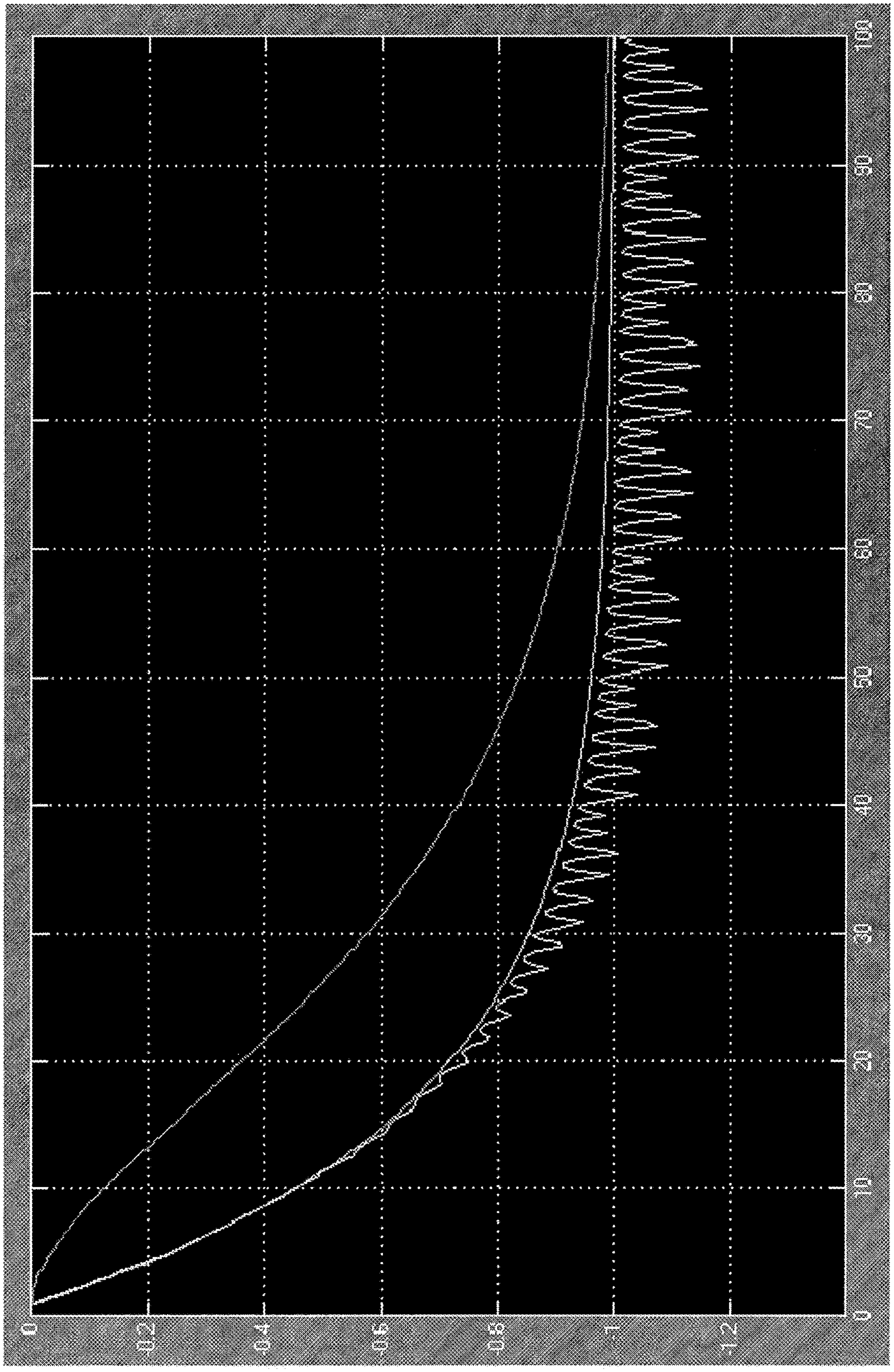
FIG. 13 is a third set of three graphs including a first line representing an actual system temperature over time, a second line representing a measured temperature, and a third line representing a predicted temperature based upon a transfer function applied to the measure temperature data represented by the second line.

So the goal is to provide a transfer function that cancels plant dynamics and provides dynamics that are much more favorable—in this case much faster to respond. There is a practical limit however, the resulting system always needs to be a little slower (otherwise it would be predicting the future or non-causal). This can be understood that if the system is too fast then noise in the measurement could be misinterpreted as actual temperature changes about to happen. The “predicted temperature” response, depicted in the jittering bottom line in FIG. 13, shows the instability if the response of the predicted temperature values, is too fast (e.g. where a=15, b=0.1) giving the following Equation 2.

$$\frac{1}{(15s+1)}\frac{(15s+1)}{(0.1s+1)}=\frac{1}{(0.1s+1)} \tag{2}$$

To implement the system in discrete time (i.e. within a microcontroller system where the temperature is sampled at specific intervals) the continuous time transfer function needs to be discretized. This can be done by first applying the bilinear transform to the transfer function. Where the transfer function is Equation 3.

$$H(s)=\frac{as+1}{bs+1} \tag{3}$$

Applying the bilinear transform we get the transfer function in the z domain, where T is the period between samples, in the form of Equation 4.

$$H\left(\frac{2}{T}\frac{z-1}{z+1}\right)= \frac{a\left(\frac{2}{T}\frac{z-1}{z+1}\right)+1}{b\left(\frac{2}{T}\frac{z-1}{z+1}\right)+1}=\frac{a(2(z-1))+T(z+1)}{b(2(z-1))+T(z+1)}=\frac{(a2+T)z+(T-a2)}{(b2+T)z+(T-b2)} \tag{4}$$

And therefore Equation 5:

$$\frac{y}{u}=\frac{(a2+T)z+(T-a2)}{(b2+T)z+(T-b2)} \tag{5}$$

Where u is the input and y is the output, cross multiplying and taking the inverse transform gives us the difference equation (Equation 6):

$$(a2+T)u(k+1)+(T-a2)u(k)=(b2+T)y(k+1)+(T-b2)y(k) \tag{6}$$

Finally changing from a forward difference equation to a backward difference equation gives Equation (7):

$$(a2+T)u(k)+(T-a2)u(k-1)=(b2+T)y(k)+(T-b2)y(k-1) \tag{7}$$

And rearranging for y(k) yields Equation (8):

$$y(k)=\left(\frac{1}{b2+T}\right)((a2+T)u(k)+(T-a2)u(k-1)-(T-b2)y(k-1)) \tag{8}$$

Where y(k) is the current temperature prediction, y(k−1) is the previous temperature prediction, u(k) is the current temperature measurement, u(k−1) is the previous temperature measurement, T is the period between samples and a and b are tuned parameters which adapt the algorithm to the system. In a system with constant sample period, the coefficients ((α2+T), (b2+T), (T−a2), (T−b2)) should be calculated once at the beginning to save processor load.

The following is noted about system modeling (i.e., selecting the value of a for the transfer function) and tuning the cooling system described, by way of example herein, for a liquid dispensing station. While there are advanced ways to model a system and account for dynamics in a more rigorous way, a 1st order system model should provide the predictive qualities required for hysteric control of the cooling system for the LDS described herein. The transfer function parameter “a” represents the time constant of the thermal system. Therefore a reasonable value to use can be obtained by applying a step temperature input to the cooling system while recording the temperature measurements over time. The parameter a can be defined as the time in seconds that it takes for the system temperature measurement to reach 63% of the final value—this is valid if there is no overshoot (system is first order). Alternatively it can be calculated by determining the time to reach 98% of the final value and dividing it by 4 to give “a”. These techniques should give a good initial guess at the value of “a” for a particular cooling system for the LDS.

The transfer function parameter “b” can be thought of as the desired response. If b=a, and “a” has been appropriately tuned to cancel the first order dynamics of the plant, then decreasing the value of a will increase the predictive quality of the algorithm and create a more responsive output. Increasing the value of “b” damps the output of the algorithm and makes it slower to respond. Ultimately “b” should be tuned by comparing the actual water temperature with that of the algorithm’s output until a satisfactory agreement is achieved.

Trial and error tuning of variables “a” and “b” of the transfer function can be conducted through experimentation. Since the primary concern is to accurately determine an actual water temperature by using the sensor temperature, a potentially useful approach to tuning the cooling system is by creating an experimental unit where there is a temperature sensor in the jacketed copper waterline just before it enters the tank but still while it is adjacent to the evaporator coil. Then, comparing the sensor readings after the transfer function is applied to it with the actual temperature in the waterline the parameters can be adjusted until there is close agreement under various changing no load, high load, input water temperatures and ambient temperature conditions.

Alternatively, the microprocessor could use recent historical actual results to locally and automatically adjust variables “a” and “b” based on actual system response. This dynamic self-tuning would represent an improvement over the generic factory defaults, allowing the system to self-adapt to the specific environment and usage patterns to which it is exposed.

The more advanced experimental way of tuning the system is by executing a number of experiments as described above while capturing the data digitally to a spreadsheet file. The data can then be analyzed to generate a transfer function that creates the best fit under all the experimental conditions.

Finally, while the predictive temperatures have been discussed in the context of a cooling system for a liquid, a similar use of predictive computation is carried out for a heating system for a heated liquid dispenser to accurately provide temperatures for guiding activation of a heating element.

Figure 14:
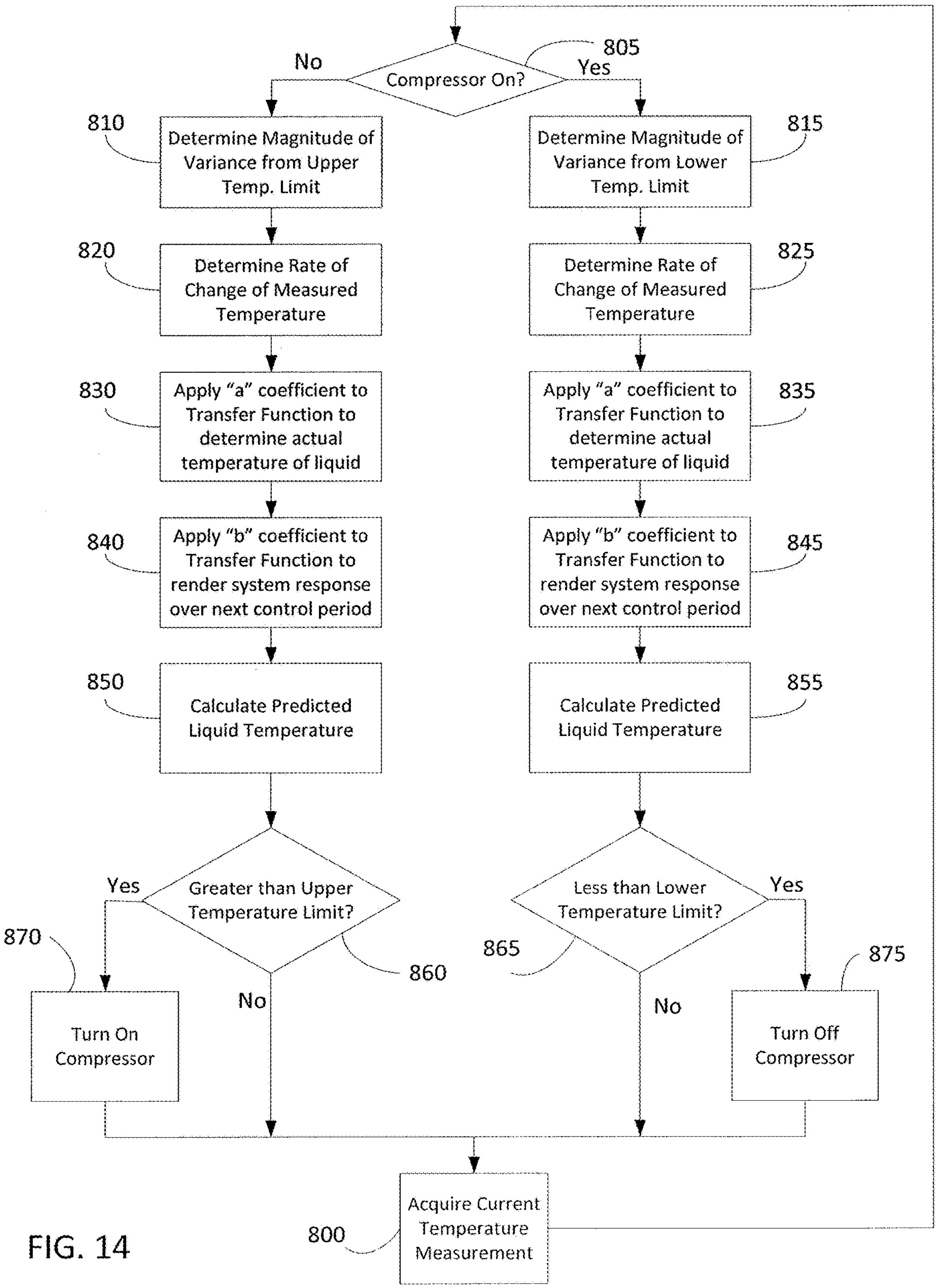
FIG. 14 is a flowchart summarizing operation of a predictive liquid temperature-based control for a compressor of a liquid cooling system for a liquid dispensing station.

Turning to FIG. 14, a flowchart summarizes computational flow and resulting control decisions performed by the controller 206 in accordance with the above-summarized predictive control scheme for controlling an operating (reservoir/output water) temperature of a liquid dispenser station. Configured values utilized by the controller include: an upper temperature limit (compressor activation temperature), a lower temperature limit (compressor deactivation temperature), and parameters “a” and “b” for the transfer function (discussed herein above). During 800, the controller reads a current temperature value based upon a sensor value provided by the temperature sensor 211 for the evaporator 203. Control passes to 805 wherein, if the compressor is not currently running, then control passes to 810. During 810 the controller 206 determines a magnitude of variance between the measured temperature provided by the temperature sensor 211 and the configured upper temperature limit specified for the cooled liquid. Control then passes to 820 wherein the controller 206 uses previous temperature readings to determine a current rate of change in the measured temperatures provided by the temperature sensor 211.

Thereafter, the controller commences a series of steps for applying a transfer function (characterized by the provided transfer function coefficients “a” and “b”) that results in the generation of a predicted liquid temperature value. In particular, during 830 the controller applies the provided “a” coefficient to render a true current temperature of the liquid, and during 840 the “b” coefficient is applied to render a system response. Thereafter, at 850 the controller 206 renders a prediction for the actual liquid temperature (if no change to the compressor 201 on/off state occurs). Control then passes to 860 where the controller 206 uses the predicted temperature to execute a control over the state of the compressor. In particular, if the predicted temperature exceeds the upper temperature limit, then control passes to 870. At 870, the controller 206 issues a signal to turn on the compressor. After a wait period (not shown in FIG. 14) the predictive control cycle resumes by returning to 800 for the acquisition of a new current temperature measurement. If, at 860, the predicted temperature is lower than the upper temperature limit, then the state of the compressor 201 remains off, and the predictive control cycle enters a wait period before returning to 800.

On the other hand, if during 805 the compressor is currently running, then control passes to 815. During 815 the controller 206 determines a magnitude of variance between the measured temperature provided by the temperature sensor 211 and the configured lower temperature limit specified for the cooled liquid. Control then passes to 825 wherein the controller 206 uses previous temperature readings to determine a current rate of change in the measured temperatures provided by the temperature sensor 211.

Thereafter, the controller 206 commences a series of steps for applying a transfer function (characterized by the provided transfer function coefficients “a” and “b”) that results in the generation of a predicted liquid temperature. In particular, during 835 the controller applies the provided “a” coefficient to render a true current temperature of the liquid, and during 845 the “b” coefficient is applied to render a system response. Thereafter, at 855 the controller 206 renders a prediction for the actual liquid temperature (if no change to the compressor 201 on/off state occurs). Control then passes to 865 where the controller 206 uses the predicted temperature to execute a control over the state of the compressor. In particular, if the predicted temperature is less than the lower temperature limit, then control passes to 875. At 875, the controller 206 issues a signal to turn off the compressor. After a wait period (not shown in FIG. 14) the predictive control cycle resumes by returning to 800 for the acquisition of a new current temperature measurement. If, at 865, the predicted temperature is greater than the lower temperature limit, then the state of the compressor 201 remains "on", and the predictive control cycle enters a wait period before returning to 800.

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A beverage dispenser comprising:

a filler including a filler outlet configured to dispense a beverage;

a fluid flow line in fluid communication with the filler outlet;

a controller configured with a processor and a computer readable medium including computer executable instructions for carrying out a set of beverage dispenser operations, the operations including an "off" operating mode characterized by no flow of beverage from the filler outlet and an "on" operating mode characterized by a flow of beverage through the filler outlet; and a base station connected to the controller and configured to communicate with an external server to transmit to or receive from the external server instructions indicating a current or a desired operating state, such that the beverage dispenser can be remotely controlled to be in the "on" or "off" operating states so that beverage flow can be selectively and remotely started or stopped.

2. The beverage dispenser of claim 1, wherein the base station communicates with the external server via at least one of Ethernet, Local Radio Network, Cellular Modem, Status LEDs, JTAG and Debug, USB, or Power Entry.

3. The beverage dispenser of claim 2, wherein the Local Radio Network is a WiFi network.

4. The beverage dispenser of claim 1, wherein the base station downloads data from the external server, the data defining a filter media change schedule.

5. The beverage dispenser of claim 1, wherein the controller is operative to detect a beverage dispenser error condition, and in response thereto transmit an error condition signal to the base station, which in turn transmits the error condition to the external server.

6. The beverage dispenser of claim 5, wherein the error condition is one of a water supply shut off, low water supply pressure or a filter tamper detection.

7. The beverage dispenser of claim 1, wherein the controller calculates operational parameters relating to the beverage dispenser and stores the operational parameters as operational data, the operational data includes a duration-of-use of a filter.

8. The beverage dispenser of claim 1, further comprising a clock configured to track and measure a duration-of-use of a filter and a volume-of-fluid-flow through the filler.

9. The beverage dispenser of claim 1, wherein the beverage dispenser is assigned to a group of beverage dispensers based on the proximity to a particular location, wherein the controller is configured to apply a set of settings transmitted to the group of beverage dispensers.

10. The beverage dispenser of claim 1, wherein the operating states also includes the "waiting to clear" state in which beverage flow has stopped and a sensor continues to detect when an object leaves the sensor field, further wherein the filler displays an "error" state when the object remains in the sensor field within a prescribed time period.

11. A method of a beverage dispenser, the method comprising:

a filler including a filler outlet configured to dispense a beverage;

a fluid flow line in fluid communication with the filler outlet;

a controller configured with a processor and a computer readable medium including computer executable instructions for carrying out a set of beverage dispenser operations, the operations including an "off" operating mode characterized by no flow of beverage from the filler outlet and an "on" operating mode characterized by a flow of beverage through the filler outlet; and a base station connected to the controller and configured to communicate with an external server to transmit to or receive from the external server instructions indicating a current or a desired operating state, such that the beverage dispenser can be remotely controlled to be in the "on" or "off" operating states so that beverage flow can be selectively and remotely started or stopped, wherein the controller calculates operational parameters relating to the beverage dispenser and stores the operational parameters as operational data, the operational data includes a duration-of-use of a filter.

12. The beverage dispenser of claim 11, wherein the base station communicates with the external server via at least one of Ethernet, Local Radio Network, Cellular Modem, Status LEDs, JTAG and Debug, USB, or Power Entry.

13. The beverage dispenser of claim 12, wherein the Local Radio Network is a WiFi network.

14. The beverage dispenser of claim 11, wherein the base station downloads data from the external server, the data defining a filter media change schedule.

15. The beverage dispenser of claim 11, wherein the controller is operative to detect a beverage dispenser error condition, and in response thereto transmit an error condition signal to the base station, which in turn transmits the error condition to the external server.

16. The beverage dispenser of claim 15, wherein the error condition is one of a water supply shut off, low water supply pressure or a filter tamper detection.

17. The beverage dispenser of claim 11, further comprising a clock configured to track and measure a duration-of-use of a filter and a volume-of-fluid-flow through the filler.

18. The beverage dispenser of claim 11, wherein the beverage dispenser is assigned to a group of beverage dispensers based on the proximity to a particular location, wherein the controller is configured to apply a set of settings transmitted to the group of beverage dispensers.

19. The beverage dispenser of claim 11, wherein the operating states also includes the "waiting to clear" state in which beverage flow has stopped and a sensor continues to detect when an object leaves the sensor field, further wherein the filler displays an "error" state when the object remains in the sensor field within a prescribed time period.

20. A beverage dispenser comprising:

a filler including a filler outlet configured to dispense a beverage;

a fluid flow line in fluid communication with the filler outlet;

a controller configured with a processor and a computer readable medium including computer executable instructions for carrying out a set of beverage dispenser operations, the operations including an "off" operating mode characterized by no flow of beverage from the filler outlet, an "on" operating mode characterized by a flow of beverage through the filler outlet, wherein the beverage dispenser is assigned to a group of beverage dispensers based on the proximity to a particular location, further wherein the controller is configured to apply a set of settings transmitted to the group of beverage dispensers; and a base station connected to the controller and configured to communicate with an external server to transmit to or receive from the external server instructions indicating a current or a desired operating state, such that the beverage dispenser can be remotely controlled to be in the "on" or "off" operating states so that beverage flow can be selectively and remotely started or stopped, wherein the controller is operative to detect a beverage dispenser error condition, and in response thereto transmit an error condition signal to the base station, which in turn transmits the error condition to the external server.

* * * * *